United States Patent
Tom

(10) Patent No.: US 8,208,958 B2
(45) Date of Patent: *Jun. 26, 2012

(54) METHODS AND APPARATUS FOR A FLEXIBLE WIRELESS COMMUNICATION AND CELLULAR TELEPHONE SYSTEM

(75) Inventor: Alfred C. Tom, San Francisco, CA (US)

(73) Assignee: Kantan Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/496,611

(22) Filed: Jul. 1, 2009

(65) Prior Publication Data

US 2009/0264148 A1    Oct. 22, 2009

Related U.S. Application Data

(63) Continuation of application No. 10/451,288, filed on Jun. 18, 2003, now Pat. No. 7,603,139, which is a continuation-in-part of application No. 09/276,480, filed on Mar. 25, 1999, now Pat. No. 6,690,947.

(51) Int. Cl.
  *H04M 1/00* (2006.01)
(52) U.S. Cl. .................. 455/556.1; 455/552.1
(58) Field of Classification Search .................. 455/557, 455/558, 550.1, 551, 552, 552.1
  See application file for complete search history.

(56) References Cited

U.S. PATENT DOCUMENTS 5,884,168 A * 3/1999 Kolev et al. ............... 455/432.1
  6,792,256 B1 * 9/2004 Kinney et al. .............. 455/277.1

* cited by examiner

Primary Examiner — Tu X Nguyen
(74) Attorney, Agent, or Firm — Dergosits & Noah LLP; Geoffrey T. Staniford

(57) ABSTRACT

A wireless communication system including flexible wireless handsets with modular electronic components selected for operation within multiple systems The units may be configured for removable connection to a variety of cartridges to provide a versatile communication device. A cartridge may be selected for the replacement of one or more existing cartridges within the handset to provide varying degrees of flexibility including the selection of a different featureset for the handset and compatible operation within different wireless systems. Methods are further provided for upgrading and reconfiguring cellular telephones and wireless communication devices for operation within different systems. A flexible wireless telephone with an original removable cartridge may include later-substituted cartridges to improve or change the featureset of the telephone, and may also enable a user to replace the internal electronics of a handset with different internal electronics for use within a different wireless system. A consumer may be thus provided with extended use the same flexible wireless telephone handset yet still migrate to a new wireless system by installing cartridges with desired featuresets within the selected wireless telephone system(s).

11 Claims, 14 Drawing Sheets

SHIFT 1: Battery Life
SHIFT 2: Signal Strength
SHIFT 3: Memory Recall
SHIFT 4: Handset Lock
SHIFT 5: Vibration/Ringer Mode
SHIFT 6: Handset Number Verification
SHIFT 7: To Be Used by Future Upgrade
SHIFT 8: To Be Used by Future Upgrade
SHIFT 9: To Be Used by Future Upgrade

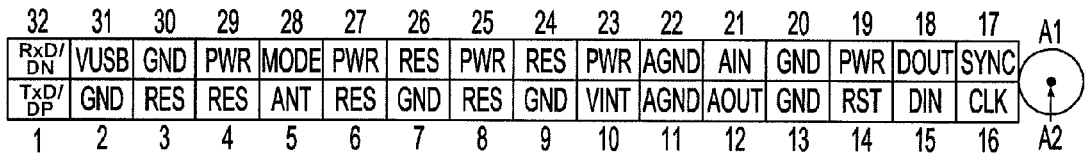

| Pin | Name | Direction | Description |
|---|---|---|---|
| | | Hydra Interface Connector Pin Descriptions | |
| 1 | TxD/DP | I/O | Serial Tx Data or USB data Buffer |
| 2 | GND | I | Radio Ground |
| 3 | RES | | RESERVED |
| 4 | RES | | RESERVED |
| 5 | ANT | I | Selection of internal antenna or external RF connection |
| 6 | RES | | RESERVED |
| 7 | GND | I | Radio Ground |
| 8 | RES | | RESERVED |
| 9 | GND | I | Radio Ground |
| 10 | VINT | I | Control interface power supply |
| 11 | AGND | I | Audio Ground |
| 12 | AOUT | O | Analog Audio out |
| 13 | GND | I | Radio Ground |
| 14 | RST | I/O | Hardware reset |
| 15 | DIN | I | PCM Data In |
| 16 | CLK | O | PCM Clock |
| 17 | SYNC | O | PCM Sync Pulse |
| 18 | DOUT | O | PCM Data Out |
| 19 | PWR | I | Radio Power Supply |
| 20 | GND | I | Radio Ground |
| 21 | AIN | I | Analog audio input |
| 22 | AGND | I | Audio Ground |
| 23 | PWR | I | Radio Power Supply |
| 24 | RES | | RESERVED |
| 25 | PWR | I | Radio Power Supply |
| 26 | RES | | RESERVED |
| 27 | PWR | I | Radio Power Supply |
| 28 | MODE | I | Selects communication mode between serial and USB |
| 29 | PWR | I | Radio Power Supply |
| 30 | GND | I | Radio Ground |
| 31 | VUSB | O | USB Port Power |
| 32 | RxD/DN | I/O | Serial Rx Data or USB data buffer |
| A1 | RFGND | I | RF Ground; Coax shield |
| A2 | RF | I/O | 50ohm RF signal; Coax conductor |

FIG.18

METHODS AND APPARATUS FOR A FLEXIBLE WIRELESS COMMUNICATION AND CELLULAR TELEPHONE SYSTEM

CROSS REFERENCE TO RELATED APPLICATIONS

This application is a continuation of U.S. patent application Ser. No. 10/451,288, filed Jun. 18, 2003, now U.S. Pat. No. 7,603,139, issued Oct. 13, 2009, which is a continuation-in-part of U.S. patent application Ser. No. 09/276,480, filed on Mar. 25, 1999, now U.S. Pat. No. 6,690,947, issued Feb. 10, 2004, which are all hereby incorporated by reference in their entirety.

FIELD OF THE INVENTION

The present invention is generally directed to wireless communication devices and related apparatus. More particularly, this invention relates to a flexible system of interchangeable wireless telecommunication componentry that is adaptable for use with different wireless communication systems and featuresets

BACKGROUND OF THE INVENTION

The current providers of wireless communication and cellular telephone products are constantly developing new equipment and related services. As these wireless communication advancements become more and more demanding on the functional capabilities of the mobile communication equipment, the relative cost of these portable devices continues to rise while consumers attempt to keep up with the latest available technology The number of cellular telephone network systems available today places a heavy financial burden on consumers who attempt to maintain state of the art services and equipment. It also places a burden on device manufacturers, who must build several versions of wireless devices in order to cover all the systems on the market In general, mobile telephones throughout different countries of the world operate on different wireless network systems or standards which may be broadly divided into either analog or digital systems. Examples of well established analog systems include AMPS, which is used primarily in the United States and Latin America, Australia, New Zealand, Russia and Asian-Pacific countries. Other types of analog type networks include ETACS and NMT which are used throughout Europe, Russia, and Asian-Pacific countries. Meanwhile, the recent advent of digital technology in wireless communications has naturally spawned its own set of digital wireless systems across the globe. Global Standard for Mobile communications (GSM), for example, is heavily used in Asian-Pacific countries, and is considered by many to be the digital standard of Europe. Other common digital systems include DCS 1800 which is used in many different countries. PCS-1900 and D-AMPS are other digital systems used to some extent in the United States, Canada, and a variety of Asian-Pacific countries Additional digital systems include TDMA IS-136, Personal Handy System, and Digital European Cordless Telephone (DECT). While digital network systems are relatively new in comparison to their analog counterpart, it is widely acknowledged that digital systems will continue to provide more cellular telephone features and improved transmission security. Today, new wireless communications systems and protocols are continually emerging as additional providers enter the market and attempt to establish still more purported standards.

There are several new wireless technologies, in particular, that are slowly emerging but not widely available or accepted yet in many countries. Personal Communication Systems (PCS) are currently in high demand, as well as Code Division Multiple Access (CDMA) systems, and the Omnipoint system which is now used in the eastern region of the United States. As these systems become more accepted and accessible, consumers will migrate from older systems using wireless standards such as AMPS or TDMA to these newly developed technologies Unfortunately, migrating to a new system with present wireless telephone technologies often requires the purchase of a new telephone unit. Because wireless telephones today are designed for use with a specific system, they often cannot be used with other systems. For example, a telephone designed for a TDMA network system cannot be used with a GSM network system. Each wireless network system has its own designated frequencies and protocols, and the supporting electronics contained within these wireless telephones are generally designed to work only within these specified parameters.

Within each particular network system, a wireless standard is established which may be generally defined as a specification for the manufacturing and operation of wireless components within the system such as the base stations, handsets, and switches. A wireless standard may further specify rules and protocols such as how a wireless telephone communicates with a base station, how a base station relays signals to another base station, and what types of signals are to be used.

Most countries designate different frequencies for their subscribers within a particular type of cellular telephone network system. The particular wireless standard within each system typically allows different implementations of the standard including variations within a carrier frequency range. Multiple implementations of the standard often require different handsets since each of these implementations practically represent another wireless system or subsystem. The frequencies used by different wireless systems may vary between approximately 800 MHz to 2.1 GHz or more. For cellular telephones operating in the 800 MHz range, wireless chipsets may be ordinarily formed of silicon. But with respect to devices that operate within the 2.1 GHz range, different materials such as GaAs is often required. Even different chip process technologies are therefore used in telephones built for different systems. In fact, the same wireless network system may include multiple implementations or subsystems of a wireless standard which require different cellular telephone handsets. For example, even if the GSM standard is adopted in many continents, each region of the world essentially implements a different wireless system because the frequency range within each system is different. On the other hand, there are a few localized systems such as the AMPS system which is consistently implemented across the United States so that the wireless system and the wireless standard are mutually coextensive. In those instances where there is no deviation from the specification of a wireless standard, or if there is only one implementation in effect, the wireless system effectively becomes the same as the wireless standard.

The widespread lack of uniformity among wireless systems today continues as new cellular telephones are introduced. However, most of these wireless units may be conceptually divided into two basic sections. One section may contain most of the basic electronics that support a particular wireless communication system, and may be referred to as internal electronics The other section may contain remaining wireless telephone components such as a display, speaker, microphone, keypad, battery, and may be referred to as external componentry. The internal electronics generally contain the specific components for operation with a particular wireless system. Today, there exists at least two industry cost trends that relate to the internal and external componentry of a wireless telephone. The first trend involves the change in relative costs of the two sections. The cost of the internal electronics has been dropping significantly. Simpler wireless chipsets are reducing design costs, and high volume production provides more economical computer chips. The cost of the external components, however, are not dropping as fast for various reasons such as the maturity of external component technologies and the demand for increased complexity in external components. As this trend progresses, the external componentry may constitute a larger percentage of the wireless telephone cost. The second trend which has been observed is directed to the increase in the total cost of wireless telephones. Advanced wireless telephones in the future will most likely incorporate more expensive components such as color active matrix displays, advanced microprocessors, high capacity memory devices, Internet access and electronic e-mail systems, and improved casing and component materials. The majority of this increased cost may be attributed to the external componentry of the wireless telephone. This cost trend will tend to further increase the comparative cost of the external componentry in relation to the cost of the internal electronics. Unlike the decreasing cost of the internal electronics, the cost of the external componentry in advanced wireless telephones is most likely to increase. The wireless communication and cellular telephone industry is not prepared to accommodate the increasing cost of new wireless telephones and the ever increasing number of wireless network systems.

The wireless communication and cellular telephone industry is also experiencing simultaneous growth in the range of available network services and features. A wireless telephone feature may be essentially considered a desired capability of the handset unit that is not critical to its basic operation such as caller ID, last number recall, fast dial, text messaging, voice message recording, signal strength indicator, and telephone number and information storage. The total collection of features for a particular wireless telephone and network system may be referred to as a featureset. In order to prolong the useful life of a wireless telephone, consumers should be able to change the featureset of a wireless telephone as new features become available. Otherwise, the telephone may become obsolete in a relatively short period of time for its lack of up-to-date features and capabilities. The lack of expandable featuresets remains an issue that has been remotely addressed by the industry at best. Some wireless digital telephones today may include reserved locations within a menu user-interface for currently unavailable services. When new features are subsequently implemented in the system, these anticipated functions may be already supported by the telephone handset when activated. The manufacturer must of course face the formidable task of constantly anticipating each possible feature in the future, and reserving sufficient space for these features in the user interface menu. These prospective features also cause early confusion among consumers when features in their menu are visible but non-functional.

In most respects, most cellular telephones available today may be characterized as inflexible due to their inability to support multiple wireless systems or simple telephone featureset upgrades. Today, wireless telephones have a limited or a relatively unexpanded featureset. A wireless telephone is typically designed with a particular fixed or limited range of features. In order to obtain more features beyond the capabilities of the handset, another wireless telephone must usually be purchased. For example, a subscriber may purchase a current model wireless telephone that is able to store telephone numbers as well as automatically initiate outgoing calls. A new wireless telephone may be introduced the following year with a previously unavailable feature that may include an alphanumeric keypad to allow a user to store and access names, addresses, and telephone numbers, in the telephone. With current wireless telephones, the user will most likely need to purchase a completely new telephone in order to obtain this feature or any other features in the future. Network systems themselves also change enough to requite users to upgrade telephone equipment. Network systems will soon start offering higher data-rate services such as GPRS, and if a user wants to use these higher data-rates, a new telephone that is compatible with the new data rates is necessary While purchasing another wireless telephone for a new featureset or a different network system may be an acceptable practice now because basic wireless telephones are relatively inexpensive, there will be a much a larger cost involved in the future as the overall cost of more advanced wireless telephones continue to rise. For instance, when a subscriber purchases a $2000 wireless telephone for a TDMA system, it will cost substantially the same amount to replace the wireless telephone when switching to another system such as the CDMA IS-95 system. Consumers are becoming increasingly mobile, particularly in the business setting, and the likelihood or demand for switching wireless telephone systems is extremely high. This restriction effectively places a price limit on how much a wireless telephone manufacturer may charge for a telephone since many consumers may not purchase an expensive wireless telephone if it will have to replaced when changing or upgrading to a different system or featureset in the near future. Although a relatively expensive wireless telephone may be very useful and offer the most current features available, its sales may be very limited because of consume fear of obsolescence. For those individuals who travel within the global community, and elect to purchase multiple wireless telephones, significant inconveniences may further arise Because users generally store important telephone numbers and information in a particular telephone, using multiple telephones for each system would be extremely inconvenient. For example, the use of different equipment typically involves a new user-interface that must be learned by the subscriber for each telephone. All information would also have to be re-entered into multiple telephones or synchronized for consistent and current information in each unit.

As explained above, new equipment is often purchased for service upgrades or migration to another wireless system. The idea of buying new telephones provides a relatively simple and feasible solution for many current customers who desire featureset upgrades or service within a different system. Wireless telephones are relatively inexpensive today, and are often offered at a minimal cost when subscribing for a new service. But the repeated purchase of new equipment win not be practical for customers who desire state of the art equipment as the cost for high performance cellular telephone equipment continues to rise. It may be possible to imbed necessary components to support more than one wireless system in a telephone handset. For example, dual-mode telephones have been designed for cellular services that use two standards such as TDMA and AMPS because the coverage of the digital systems may still be inadequate. Users may need to occasionally access an alternate network system such as AMPS in certain areas. However, these telephones cannot support systems other than the limited number of systems for which they were originally designed. For example, a TDMA/

AMPS dual-mode telephone cannot be used in Europe because it is incompatible with GSM systems. A user would be required to use another telephone capable of working with yet another network system A wireless telephone designed for every presently known wireless system in use today would be prohibitively large and extremely expensive. In any event, the unit would still be incompatible with available systems that will be undoubtedly developed in the future.

Another example of previous systems with relatively expensive external componentry includes a laptop computer and cellular telephone that operate in turn with the same Type III PC Card. The card was configured in a limited manner for the selected operation of either the cellular telephone handset or computer. This card also included an extra level of complexity requiring attachments such as an earpiece and corresponding handset jack, protruding components that were unsightly and flimsy, and relatively complicated user interfaces. The Type III PC card was also limited to the AMPS wireless system or protocol, and provided a rigid or fixed feature-set built into the telephone that could not be replaced or upgraded. Moreover, the PC card could only operate with a particular cellular telephone handset and a compatible laptop computer in an attempt to reduce the cost or need for common wireless components included in each product. In particular, the PC card could be either used in the laptop to support AMPS data communications, or in the telephone for AMPS voice communications. This Type III PC card was not designed for other wireless systems, and only included components that were specific to the AMPS system. Furthermore, the PC card was costly due to the high cost of supporting the PCMCIA standard For example, the PCMCIA standard requires all signals to be in digital form, and this digitization process adds to the cost of the PC card and telephone. Last, the PC card could not support an antenna in the laptop or the telephone, limiting the versatility of the PC card. As with other devices described above, this expensive computer and handset system was only briefly introduced, and provided a relatively inflexible wireless product for use with only a certain wireless standard and a restricted range of features. Yet another example of previous systems with relatively expensive componentry is the Motorola 9550 satellite phone introduced in January 2000 This phone was made primarily for communication with the Iridium satellite network, but allowed for use of the phone with other terrestrial networks via detachable cassettes that could be added and removed from the satellite phone. Unfortunately, the phone's internal electronics are specific to the Iridium network and cannot be changed or removed, making the phone much more costly and bulky than necessary. Also, the cassettes cannot use the antenna in the phone and come with antennas already attached to the cassette body. The cassette antenna is not retractable or detachable, making the cassette more bulky than necessary. The cassettes also are designed specifically for the 9550 and are not designed for other phones. For example, the shape of the cassette body matches the contour of the 9550. All these characteristics limit the usefulness of the 9550 system. The continuous lack of flexibility in current wireless communication systems and services provide consumers with no reasonable or cost-effective alternatives in maintaining equipment for extended periods of time.

The existence of multiple network systems in the world not only causes problems for consumers but for telephone manufacturers as well. Instead of building one telephone that can be used all over the world, manufacturers must design a separate wireless device for each of the world's network systems in order to sell devices to all the world's wireless consumers. To cover just the United States market alone a manufacturer must build six different versions of one telephone design. Since each telephone version costs in the neighborhood of $10M and takes over a year to design, this is a significant problem indeed.

The available solutions that address this problem for manufacturers are woefully inadequate. Some companies offer wireless modules that a device manufacturer can incorporate into a telephone design, and modules exist for many wireless systems in use today. Unfortunately, the effort to incorporate one module into a telephone design is completely different from the effort to incorporate another module into the same telephone design because the connections between the telephone and the different modules are not the same. As a result, one cannot build one telephone design that is able to use different modules for different standards. Also, the size and shape of many modules available are inappropriate for certain device designs such as wireless telephones The modules do not contain their own integrated antenna and thus rely on the device to supply the antenna. This requires the device's antenna to be designed to work with all present and future wireless systems, an almost impossible task. Lastly, the modules are not designed to be removable, leaving no provision for upgrading the wireless device or using the wireless device in multiple systems. The continuous lack of a flexible wireless device design has placed a significant burden on manufacturers who want to offer telephones to all the world's wireless consumers.

SUMMARY OF THE INVENTION

The present invention provides methods and apparatus directed to a flexible wireless communication system. Flexible wireless handsets with modular electronic components may be selected for operation within many different analog or digital systems. The units may be configured for removable connection to a variety of modular cartridges to provide a versatile communication device. A cartridge may be selected for the replacement of one or more existing cartridges within the handset to provide varying degrees of flexibility including the selection of a different featureset for the handset and compatible operation within different wireless systems. Another aspect of the invention provides methods for upgrading and reconfiguring cellular telephones and wireless communication devices for different systems or faster data rates within a system. A flexible wireless telephone may be initially selected with an original removable cartridge that may be later substituted with additional cartridges to improve or change the featureset of the telephone. A flexible wireless telephone as provided herein may also enable a user to replace a removable cartridge containing the internal electronics of a wireless system with another cartridge with different internal electronics for use with a different wireless system. A consumer may thus continue to use the same flexible wireless telephone handset yet still migrate to a new wireless system by installing a cartridge with a desired featureset within a selected wireless telephone system This invention also has advantages for wireless device manufacturers. A device manufacturer may need only design a single device version and have that single version usable with different network systems depending on what cartridge is attached to the device. In fact, a manufacturer may ship a device without a cartridge, leaving the choice of cartridge up to the user. This may save the manufacturer development cost and time because a device that uses available cartridges on the market is much simpler to design than a device with the internal electronics built-in.

The inflexibility of current cellular telephone products has not been directly recognized or openly addressed by the industry A reason why the problem of inflexibility with existing devices has gone largely unnoticed may be attributed to the current wireless telephone cost structure which does not make the upgrading of wireless telephone equipment or services cost-effective. Since the internal electronics component represents a relatively large portion of the cost of common wireless telephones today, replacement of these portions would be, in effect, similar to buying a new unit. But there is an emerging market for more expensive high-end cellular telephones or handsets that provide more functions and greater featuresets through the continuing developments in wireless communications. The external componentry for these portable devices may rapidly become more expensive than their respective internal electronics, and in these markets, the problem of inflexible wireless communication systems will become even more prevalent. The continued existence of inflexible wireless telephones and systems may be further attributed to the industry practices which continually encourage consumers to purchase new equipment. This will often fuel demand for new wireless telephones much like the trend for purchasing the latest or improved versions of products in the computer hardware and software industry. Additionally, subscribers themselves may simply not recognize the current need for telephone handsets that are upgradeable and versatile. The present wireless market continues to emphasize, while consumers persist in demanding, small and light-weight devices. As a result, some of the primary goals for wireless telephone manufacturers have been to create the smallest or the lightest units possible which may be sold at a premium. Current subscribers may not be immediately concerned with the inability of devices to operate with different systems. Many consumers do not even recognize the inflexibility of wireless telephones and systems, and cannot therefore articulate a need for a more feasible alternative. Because the problem of inflexible wireless telephones has largely gone unnoticed, currently available solutions are entirely inadequate.

The present invention is directed to the need for flexible wireless telephones and systems. The components of a cellular telephone formed in accordance with the invention may be replaced to support the operation of a different wireless system and/or to change the featureset of the unit As a result of this invention, with minimal development effort manufacturers may design one flexible wireless device that can be used in any present and future system depending on which components are used in the device. The invention may be also directed to the need for a wireless telephone that includes modular functionality to operate with any wireless system, and a wireless communication and cellular telephone system that has expandable or upgradeable featuresets to accommodate future user demands. For example, a modular cellular telephone cartridge kit may be selected for updating a configurable cellular telephone handset comprising a replacement cellular cartridge with electronic wireless communications components that provides a set of selected mobile telephone features for a cellular telephone system. The cartridge may include an interface configured for connection to a cellular telephone handset having an existing cellular cartridge that already supports the operation of a cellular telephone system The kit may also include a set of instructions for updating the cellular telephone handset by replacing the existing cellular cartridge with the replacement cellular cartridge. The cartridge components may include a RF/IF subsystem, a baseband subsystem, a voice processing subsystem, and a power management subsystem. The components may be integrated onto at least one computer chip, and may support a variety of systems including an AMPS wireless system, a GSM system, a TDMA system, or any combination thereof. The replacement cellular telephone cartridge may be a PC card that substantially conforms with established PCMCIA standards or not.

Another variation of the invention includes a wireless communications integrated circuit kit for upgrading a configurable wireless communications device comprising one or more modular integrated circuits having a plurality of wireless electronic components that provides an upgraded set of predetermined features within at least one wireless communication system. The computer chip may include an interface configured for connection with a wireless communications device that supports the operation of the set of predetermined features Instructions to upgrade the configurable wireless communications device may be included.

In yet another embodiment of the invention, a universal wireless cellular telephone handset is provided comprising at least one wireless communication component that supports a set of selected mobile telephone features for a cellular telephone network system An interface may be formed in the unit for connection to a plurality of modular cellular telephone cartridges each having a plurality of electronic wireless communication components that provide a unique set of selected mobile telephone features. The handset may include a microcontroller, a microprocessor and a memory storage with a computer operating system. The interface of the wireless cellular telephone handset may substantially comply with a PC Card standard established by the PCMCIA, and may include a plurality of connections configured as sockets, or ports for smartcards, infrared communications, data exchange with other wireless or non-wireless devices. The handset may be accompanied with a set of instructions for changing the set of selected mobile telephone features or the cellular telephone network system by removably connecting different modular cellular telephone cartridges to the handset Another embodiment of the invention provides a universal wireless communication device comprising a wireless communication handset having a first set of at least one wireless communication component that supports at least one selected wireless communication system. The handset may include a handset interface in communication with the first set of at least one wireless communication component configured for communication with a plurality of modular cartridges. A modular cartridge with a second set of components may provide a set of wireless communications features to the handset through a cartridge interface in communication with the second set of components. The cartridge may be removably connected to the handset interface to provide a shared coupling or access between the first and the second set of at least one wireless communication component. The modular cartridge may have at least one microcontroller for controlling the wireless communications device, an integrated circuit, or any combination of wireless communications subsystems. The telephone may further include a smart battery for providing a controlled power source to the communication device. The modular cartridge and the wireless communication handset may be configured to substantially conform with a selected PCMCIA standard. The wireless communication handset may be also formed with numerous slots or openings, and may include a moveable cover to retain and conceal the cartridge within the handset.

In yet another embodiment provided in accordance with the invention, a universal wireless system may be implemented for a plurality of wireless systems A handset for this embodiment may include communication components that supports a first and a second cellular system. An interface formed in the handset may be in communication with a first modular cartridge that provides features for the first cellular system through a first cartridge configured for removable connection to the handset. A second modular cartridge may provide a set of features for the second cellular system through a second cartridge interface that may be configured for removable connection to the handset interface. The first cellular system and the second cellular system may be the same or different wireless cellular systems. The first and second set of wireless communications features may be also the same or different. A universal cellular telephone may be thus reconfigured in accordance with the invention. The wireless communication handset may be formed with a handset interface in communication with a first set of wireless communication components in the handset. A first modular cartridge may be selected having a second set of components that provides selected features for a cellular system. The cartridge may include an interface in communication with the second set of components that is configured for removable connection to the handset interface. A set of instructions may be provided for reconfiguring the wireless communication handset comprising the following steps of selecting a second modular cartridge having a third set of at least one wireless communication component that provides a second set of wireless communications features for a second cellular system and a second cartridge interface in communication with the third set of at least one wireless communication component configured for removable connection to the handset interface, disconnecting the first modular cartridge interface from the handset interface, and connecting the second cartridge interface to the handset interface. The first and the second set of wireless communications features may be different or the same, and the first and the second cellular system may also be different or the same.

Additionally, the principles of the invention may be applied to a variety of wireless communications devices for exchanging voice, data, video or any other type of transmissible information, including but not limited to smartphones, handheld computers, and transportation vehicles.

Another aspect of the present invention includes various methods of forming and operating a flexible wireless communications system. For example, the invention provides a method for reconfiguring a flexible wireless communication device comprising the steps of selecting a wireless handset having wireless communication componentry in communication with at least one handset interface and a first removable wireless communication cartridge with a first set of preselected features for a first wireless communication system that is removably connected to the handset through the at least one handset interface, disconnecting the first removable wireless communication cartridge from the at least one handset interface, selecting a second wireless communication cartridge with a second set of preselected features for a second wireless communication system that is configured for connection with the at least one handset interface, and connecting the second wireless communication cartridge to the at least one handset interface to reconfigure the flexible wireless communication device for operation with the second wireless communication cartridge. A plurality of wireless communication cartridges may be connected to additional handset interfaces formed within the wireless handset. The first wireless communication system may be the same or different from the second wireless communication system, and similarly, the first and the second removable wireless communication cartridges may provide either the same of a different set of preselected features. The removable wireless communication cartridge may even support more than one wireless cellular communication system.

A method of upgrading cellular telephones is further provided herein comprising the following steps of selecting a cellular telephone handset connected to a first removable cellular telephone cartridge that includes electronic wireless components that provide a preexisting set of features for a particular wireless system, disconnecting the first removable cellular cartridge from the cellular telephone handset, and replacing the first removable cellular telephone cartridge with a second removable cellular telephone cartridge that includes electronic wireless components that provide an upgraded set of features for the wireless system.

By providing a flexible wireless communication device in accordance with the invention, handset units may be useful for a longer time without becoming rapidly obsolete. Because the same telephone may be used for multiple systems, an operator may be only required to learn or understand the operation of a single unit, and maintain user data in a central location. A flexible wireless telephone would also allow individuals such as world travelers to learn and operate the user-interface of only one telephone. The same telephone may be used with different wireless systems by replacing all or part of its internal electronics with components designed for other systems. The telephone may even gain new features by replacing the existing electronics with additional component electronics that enable these new features. The flexible telephones described herein provide relatively uncomplicated solutions to upgrading the unit by simply replacing a cartridge that may be as easy as replacing a battery within a portable electronic device. This cartridge-style replacement system may be even more robust than circuit-board replacement. Moreover, the modularity may provide easier repair of communication handsets such as cellular telephones. When the unit is malfunctioning, the cartridge may simply be replaced to provide a more economical solution.

Furthermore, this flexible telephone invention reduces the design and testing effort for developing a wireless device because manufacturers may use readily available cartridges that are already designed, tested, and approved. And, the resulting flexible device may be used in any system. Current available modules may still require testing and approval from various approval agencies, and the design of current modules do not allow users to swap between modules. Telephone handsets provided in accordance with the principles of the present invention may further include replaceable antennas. An original telephone handset may be further modified to offer a wide range of optimal frequencies whereas replacement of the circuit-board assemblies in some present day telephones do not allow replacement of an antenna component. A unit may also provide relatively easy access to the cartridge component to allow for replacement. Meanwhile, current handsets are not designed for user-level upgrades or reconfiguring, and are not intended to provide access to internal components. Most cellular telephones today may not be opened, and are particularly difficult to re-assemble even when their interior may be accessed. The circuit board, the module, or other internal electronics of present cell phones may not be readily changed. The disassembly of devices of today presents the risk of emitting harmful levels of radiation upon re-assembly, or the unauthorized or illegal transmission of communication signals. However, handset cartridges provided herein may be properly manufactured in advance, and may continue to be FCC compliant. Moreover, a cartridge may be easily replaced in a predetermined or uniform manner or location as opposed to current circuit-boards and modules which may be positioned in virtually any manner selected by manufacturers. The handset and cartridge components may be manufactured by different vendors in accordance with a standardized interface configuration between the component assemblies such as those established by the PCMCIA. This modular architecture enables relatively simple replacement of the internal electronics. Because most units today include internal hardwired components that are relatively integrated in order to meet selected size and weight parameters, these devices fail to provide the modularity, flexibility, and upgradeability offered by the invention. Meanwhile, the modularity of the wireless communication handset and cartridge(s) systems provided herein offer a wide range of flexibility. The handset and cartridge assemblies do not require particular subsystems of components to be installed in a fixed section Neither the cartridge nor the handset is required to include a particular or fixed arrangement of modem electronics or any other electronic componentry. The flexible wireless systems described herein therefore provide an effective way to change the featureset and/or wireless system supported by a wireless device to effectively extend its usefulness and product life.

Other objects and advantages of the invention will become apparent upon further consideration of the specification and drawings. While the following description may contain many specific details describing particular embodiments of the invention, this should not be construed as limitations to the scope of the invention, but rather as an exemplification of preferred embodiments. For each aspect of the invention, many variations are possible as suggested herein that are known to those of ordinary skill in the art.

BRIEF DESCRIPTION OF THE DRAWINGS

FIG. 18 is interface pin chart and diagram illustrating coaxial and pin locations for corresponding connections to device components and systems.

DETAILED DESCRIPTION OF THE INVENTION

Figure 1:
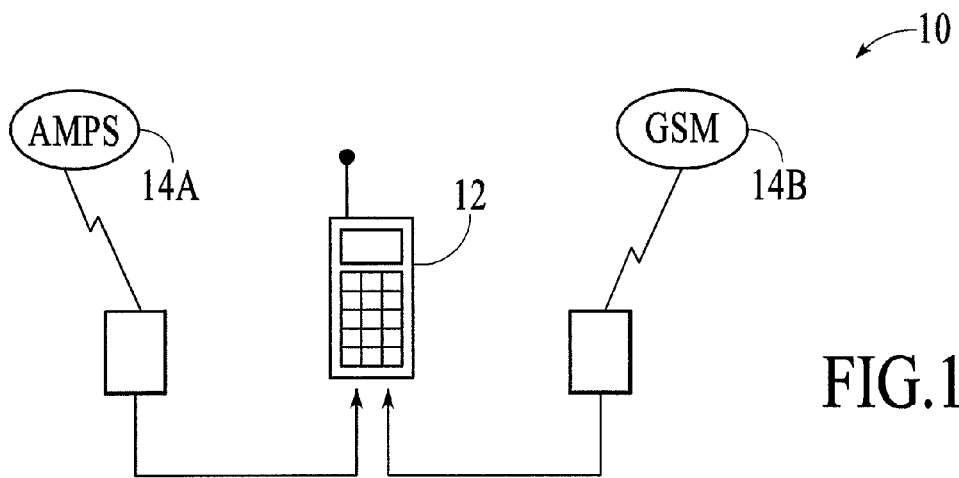
FIG. 1 is a simplified diagram illustrating a flexible wireless communication system that includes a cellular telephone handset and cartridges for use with different cellular network systems or standards such as the AMPS and GSM wireless systems.

The present invention provides methods and apparatus for a flexible and versatile wireless communication system. The particular features of the described embodiments in the following description may be considered individually or in combination with other variations and aspects of the invention FIG. 1 provides a simplified diagram illustrating a flexible wireless communication system 10 formed in accordance with the principles of the invention The wireless system 10 may include a cellular telephone handset 12 and one or more modular cartridges 14A and B. Separate cartridges 14A and B may support the operation of different cellular network standards and radio frequencies around the world including AMPS, GSM or any other wireless system or protocol. Although many cellular telephones share a common wireless infrastructure, they often include a variety of different external componentry. For purposes of the following description of the invention, it should be understood that a wireless telephone may be defined as a communication device within a particular wireless system or network. Examples of wireless telephones may include cellular, cordless, personal handy, and infrared telephones as well as smartphones, wireless handheld computers, and even transportation vehicles with wireless capability. In comparison, examples of wired telephones typically include land line communication devices that rely on hardwired connections such as twisted pair or RJ-11 cords A wireless telephone is most often small and portable, but can greatly vary in weight or size. The physical characteristics of the handset and the cartridge described herein may vary greatly, and may conform to known cellular telephones designs or those developed in the future.

As shown in FIG. 1, a flexible wireless telephone 12 may operate within an AMPS wireless system with a preselected cartridge 14A. The apparatus may include a basic flexible handset 12 and a first preselected cartridge 14A or B that includes a featureset within the wireless system 10. Although the handset generally shown in FIG. 1 is described in a relatively simplified manner, the invention may incorporate highly sophisticated wireless telephone designs which may be equally adaptable Other flexible wireless telephones may be commercially available in the future which contain additional features and are applicable to the invention The handset 12 may operate within multiple wireless systems, and may be selectively connected to a second preselected cartridge 14B for operation with GSM or any other system The second cartridge 14B for the GSM wireless system may include the same or similar basic components, wiring, and mechanical features of the AMPS cartridge 14A, but the wireless components may be configured for operation within the GSM system. The specific radio frequencies and individual wireless components within these cartridges for each particular wireless communication system are well known to those of ordinary skill in the field as described in the Philips Semiconductors for Wireless Communications Handbook (1997) which is incorporated herein by reference in its entirety In another embodiment of the invention, a universal wireless cellular telephone system is provided as a cellular telephone kit with a set of cartridges as similarly shown in FIG. 1. The wireless kit may include a wireless communication handset having a first set of at least one wireless communication component that supports at least a first and a second cellular system. The first and the second cellular system may be the same or a different system or wireless standard such as AMPS or GSM or even similar wireless systems with different ranges of operating frequencies and different data rates. The handset may also include a handset interface in communication with the first set of wireless communication components. A first modular cartridge may be provided having a second set of at least one wireless communication component that provides a first set of features for the first cellular system. The first cartridge may be formed with an interface in communication with the second set of wireless components within the first cartridge. The cartridge interface may be also configured for removable connection to the handset or the handset interface. In addition, a second modular cartridge may be included in the kit or system having a third set of at least one wireless communication component that provides a second set of features for the second cellular system. A second cartridge interface may be similarly provided that is in communication with the third set of components within the second cartridge. The second cartridge interface may also be configured for removable connection to a handset interface. It should be understood that the first and the second set of wireless communications features within each cartridge may provide the same or a different collection of services. The exact same features such as call waiting and caller ID may be provided or supported by the cartridge in each instance, but within different wireless systems. An entire new set of features may be selected for cost-effective operation within the same system on the same handset.

The modular cartridges and flexible handsets provided herein may continually support expanded or improved features in a variety of wireless systems. In the day-to-day operation of a cellular telephone, for example, an individual may use the flexible handset in essentially the same manner as any other present day wireless telephone. A subscriber may initiate and receive telephone calls in the ordinary course of conversation, and at the same time, perform other available handset functions that are selected including conference calling, call waiting or forwarding. However, when the user desires or is forced to operate within a different wireless system or to use different features or data rates within the same wireless system, the user would not be required to switch to another wireless telephone as would be the case with wireless telephones of today. Rather, the user may easily switch an existing cartridge with a replacement cartridge within the handset to support operation within the different wireless system. An entire new featureset may be simultaneously added within selected cartridges to access other capabilities offered by the handset. As a result, the same telephone handset may be continually used by a subscriber who is traveling between areas serviced by different wireless systems, within a different set of operating frequencies for the same system, or with different data rates within the same system.

Figure 2A:
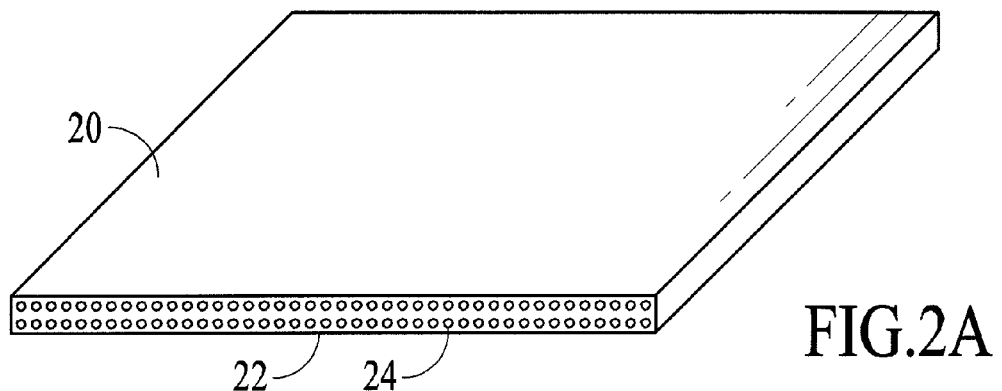
FIG. 2A is a perspective view of a removable mobile telephone system cartridge containing internal wireless communications componentry that may be installed in a flexible wireless cellular telephone.

FIG. 2A provides an illustration of a removable mobile telephone system cartridge 20 that may be installed in a flexible wireless cellular telephone. The overall configuration of the wireless communications cartridges described herein may be readily varied according to accepted product standards. For example, the cellular telephone cartridge may be basically configured as a PC card with a Type I, II or III PCMCIA configuration, or a Compact Flash card configuration. The cartridges may conform to any selected standard including current or future PCMCIA of Compact Flash standards. Additionally, the cartridge may also include an antenna (not shown) to support one or more wireless communication systems. Many different antennas may be selected for reception of RF waves or signals in numerous wireless systems around the world. An appropriate shape, size and length may be therefore selected for any particular antenna component in relation to the cartridge. The antenna may also be retractable or set at a fixed length or position with respect to the body of the cartridge. Alternatively, it may be desirable to provide the cartridge with a detachable antenna which may facilitate repairs or support the change of operating frequencies within a new or different wireless system. Or, it may be desirable to provide the cartridge with the ability to support an antenna in both the handset and the cartridge. The cartridge and the handset may exchange software and hardware signals to negotiate and decide which antenna to use. The overall appearance and color of the cartridge, antenna, handset or any other component of the wireless system and components described herein, may be varied according to current specifications or those developed in the future. For example, the wireless communications components within the cartridge may be directly exposed or enclosed within a casing or housing formed of substantially transparent material, or otherwise visible to some extent by an operator. Alternatively, the wireless communications components may be entirely covered or hidden from view within a casing formed of plastic or other suitable material. When the cartridge is connected to the telephone handset, at least some portion of the cartridge may be visible, or the components may be thus completely hidden from operator view.

A modular cellular telephone cartridge 20 as illustrated in FIG. 2A may be offered as part of a kit for updating a configurable cellular telephone handset (not shown). The cartridge kit may include a replacement cellular cartridge 20 with wireless communications components that provide a set or collection of selected mobile telephone features for at least one cellular telephone system. The features may include any function supported or provided by the wireless telephone. A cartridge interface may be formed with a coupling configured for connection to a cellular telephone handset. The cellular handset may at times already have an existing cellular cartridge that supports the operation of at least one cellular telephone system, and may be updated or upgraded with a replacement cartridge 20. The cartridge kit may include a set of instructions for updating the cellular telephone handset by replacing the existing cellular cartridge with the replacement cellular cartridge. The instructions may be provided in any form including a standard sheet of written instructions packaged with the cartridge, a description printed directly onto the package or cartridge, stored instructions on electronic media such as videotape or floppy disks, or any other manner to provide instructions to replace the cartridge. The cellular telephone cartridge kit may be packaged for at least one cellular telephone system including an AMPS or GSM system that is supported by the wireless communication components of the cartridge A single integrated modular cartridge may support a plurality of cellular telephone standards such as the AMPS and TDMA systems, or any other combination of systems. A cartridge may have the ability to support a pre-paid wireless subscription service, in which the user would buy a cartridge with a set amount of minutes to use with the handset. When the minutes get used up, the user may add more minutes to the cartridge, return the cartridge, or discard the cartridge. Many different wireless communication systems or protocols may be supported with the same flexible handset in combination with an appropriate set of interchangeable cartridges.

Modular cartridges formed in accordance with the principles of the present invention may include a wide variety of wireless communications componentry and subsystems. Any of these subsystems may be alternately installed in the corresponding handset as opposed to the cartridge component. Wireless communications components within a cartridge may include a radio frequency/intermediate frequency (RF/IF) subsystem. The RF/IF subsystem may further include any number of transmitters and receivers, and may further include IF processing circuitry to further reduce or process RF signals. In addition, the RF/IF subsystem may contain frequency synthesis components to manipulate or generate selected signals. Another possible subsystem within the cartridge may include a baseband subsystem with a digital signal processor component. Other possible subsystems may be directed to voice processing and power management. Yet another subsystem may give the cartridge the ability to configure its operation based on the capabilities of the handset. Any of the subsystems or associated wireless electronic components may be integrated onto at least one computer chip. The at least one computer chip many further include at least one microcontroller, a central processing unit, a microprocessor, a memory storage device or a digital signal processor.

The modular cartridge 20 show in FIG. 2A may be formed with established electrical-pin configurations The cartridge interface 22 may include interface pins 24 configured for communication with a corresponding cellular telephone handset interface (not shown). In one embodiment of the present invention, handset and cartridge interfaces may conform to the mechanical specifications of the 1995 PC Card standard The cartridge interface 22 or its particular pin architecture may substantially or completely comply with PC Card standards established for any given year, or with other mechanical designs similar to a PC Card pin architecture The female pin holes 24 formed along the cartridge interface 22 may fit with corresponding male pins within a handset interface once the cartridge is connected to or inserted into the handset. The interface pins 24 may include both operational and reserved pins. The operational pins may correspond to active pins that support particular functions in a particular handset. The reserved pins may correspond to currently non-active pins that are reserved for functionalities to be added in the future with a different handset or within a different wireless system. The pin hole designations provided by the cartridge may conform to particular pin functionalities for a handset/cartridge interface. It will be observed that any suitable pin arrangement may be selected, and may include the following pin number arrangement and designated functionality: 1 GND; 2. $GND_2$; 3. $V_{CC}1$; 4. $V_{CC}2$; 5. $V_{REF}$; 6. $V_{ss}$; 7 SCL ($I^2C$ Bus); 8. SDA ($I^2C$ Bus); and 9. Power Toggle. Antenna pins may be 10. $ANT_1$ and 11. $ANT_2$. A set of pins for an LCD may include: 12. $V_o$; 13. $V_{LCD}$; and 14. $V_{DD}$. The following group of pins may be assigned for microphone operation: 15. $IN_1$ (analog audio in); 16. $IN_2$ (analog audio in); 17. Microphone Gain Control; 18. VOX output; and the speaker: 19. $OUT_1$ (analog audio out); and 20. $OUT_2$ (analog audio out) Keypad pins may include: 21. Keypad Data and 22 Keypad Interrupt. The battery pins may be: 23. Positive and 24 Negative. Other active and reserved pins may be designated as follows: 25 Reserved; 26 RF bypass; 27. $DATA_{in}$; 28. DATAout; 29. RSSI (Received Signal Strength Indicator); 30 TEST; 31 CIK; 32. Battery Full indication; 33. Battery Low indication; 34 Battery Charger Connected; 35-36 Charge Battery Output; 37 Unit in Use indicator; 38-40 Battery Level pins (SCI, $I_{OSC}$, SCAN); 41. Battery Voltage Detector (VAC); 42-76 (other pins). For additional functions, pins 77-84 may be reserved pins for future upgrades or improvements. Pins 77-84 may also be used to supply additional power and ground connections to the cartridge if needed. It should be understood that all pins are not necessarily connected to only one particular wireless subsystem or circuit. For example, the SCL and SDA ($I^2C$) interface pins may be connected to other integrated circuits in addition to those specifically mentioned. A variety of microcontrollers, i.e., Phillips P83CL580, may be included within the cartridge that are also connected to SCL and SDA pins. While almost any combination of wireless subsystems may be provided within the cartridge section, certain wireless communication components such as liquid crystal displays (LCDs) may more practically reside in a handset as opposed to the cartridge. The particular pin configuration and assignment of pin numbers for selected functions supported by the cartridge and corresponding handset may be implemented according to designations adopted and known by those of ordinary skill in the field.

The handset/cartridge interface may include both active and non-active pins for any number of PC Card pin configurations including a 68-pin architecture. Particular pins may support fully operational functions within the handset and cartridge, as described above, and other pins may be reserved for future use. For example, the handset may be formed with reserved male pins even though the cartridge and the handset do not support any current corresponding function The reserved pins are included within the handset and cartridge interface in order to allow future expandability when the need arises. When more active pins are needed for operating other flexible wireless telephones, for example, the available number of reserved pins within the same 68-pin interface may be activated to support new functions.

The reserved pin architecture of cartridges described herein effectively extends the lifespan of an adopted interface specification while providing another level of control in offering subscriber services. By reserving pins for future use, a manufacturer is not forced to completely design a new interface when additional pins are needed for subsequently developed functions. For example, a manufacturer may initially provide wireless telephones to its subscribers according to an accepted specification and architecture to support a current set of features. However, it may subsequently develop additional features such as an infrared port for its wireless telephones. The infrared port may operate with two additional pins in the cartridge/handset interface to exchange data to and from the cartridge. Because the handset/cartridge interface includes reserved pins, the manufacturer may assign or dedicate any number of unused or available pins for the infrared port The absence of this reserved pin architecture would most likely lead to the costly creation of a new interface involving new part designs and tooling. At the same time, the reserved pins of the invention also provide a manner in which manufacturers can limit or control the range of accessible features within a particular handset. A handset may be fully capable of providing a greater number of functions to a subscriber than the person is willing to pay for at the current time The subscriber would be therefore provided with an appropriate cartridge having a relatively limited set of functions and components to support these selected features though active pins. The reserved cartridge pins in this case would essentially serve no instant function. Although the handset may actually support additional functions, they would not be accessible without an appropriate cartridge with corresponding components and designated active pins. Specifically, the flexible wireless telephone may include a particular control or button for a currently unselected feature that may nonetheless send signals to selected pins in the cartridge interface. Since the cartridge may enable or provide support for only certain functionality, and may not include suitable componentry to support the unselected function or the selected corresponding handset pins, signals sent by the control to the cartridge in this instance can be essentially ignored However, a replacement cartridge may be substituted with supportive wireless components to access the function with a corresponding interface that recognizes the selected pins and/or signals to perform selected functions when activated. Service upgrades may be readily performed in the same manner with the replacement of a cartridge within a handset. For example, a handset interface may include a redial (RDL) button on a handset to provide a redial function for the last number entered, and a special (SPL) button for a special or currently undefined function. When the special function is not supported or defined by the selected cartridge, handset signals sent to the cartridge from the SPL or the special instruction button will be ignored However, telephone manufacturers may subsequently decide to offer a one-touch emergency number 911 feature that may be activated by touching the reserved SPL button. An existing cartridge with only the RDL function may be therefore replaced with one that also includes the emergency dial feature. The replacement cartridge will include the appropriate components and instructions to provide this added feature, and will now recognize signals sent through pins assigned to the SPL button. A shift key (SFT) or any other type of defined key may provide even more additional reserved functions within a given interface and pin configuration. As a result, the same wireless telephone unit may gain at least one new feature or a set of new features by the replacement cartridge. The use of reserved pins and buttons within a handset interface on a keypad or a separate control provide even more expanded capabilities to the flexible wireless telephones described herein. A higher level of flexibility and upgrading may be thus achieved for both the operation of the handsets within different wireless systems and their available functions.

Figure 2B:
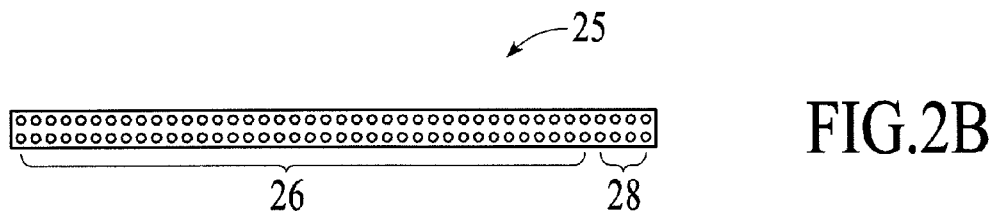
FIG. 2B is a simplified side view of a modular mobile telephone cartridge illustrating the handset/cartridge interface that may include operational and reserved pins for connection to wireless telephone handsets.

FIG. 2B illustrates another modular mobile telephone cartridge 25 with a cartridge interface that may include operational 26 and reserved 28 pins for connection to wireless telephone handsets. The interface between the handset and the cartridge may both include complementary pin structures or connective elements other than conventional PC Card configurations The interface may include many different types of connectors, female and male pin configurations, or signal transmitting structures. The interface may also include a coaxial connector for connection to an antenna. A reserved pin architecture may be similarly applied to provide connectors that are not currently used by the handset or the cartridge. At least some of these connections may be reserved and subsequently used by a future handset/cartridge combination to provide additional functionality or features later developed. Furthermore, it may be possible to implement a flexible wireless telephone that receives a cartridge that completely adopts a particular standard such as the 1995 PC Card standard or any other PC Card standard implementation One of the primary advantages for PC card embodiments of the invention is that the PC Card implementation is widely considered a common and proven standard. However, it is possible to modify a wireless handset previously configured to a particular standard with appropriate adaptors or interfaces to fit an existing or updated cartridge configuration. When a PC Card configuration is adopted in its entirety, certain components of the handset would be modified accordingly to conform with system requirements. For example, the analog voice signals to the speaker and the microphone may be digitized in the handset before communication across the PC card interface. Other wireless communications components such as a display, speaker, and other handset control signals may also conform to digital signal parameters for the PC Card bus architecture. Alternatively, the PC card may be adopted strictly as a mechanical standard only. This relatively simple embodiment of the invention may leverage the PC Card standard in certain respects, and borrow only the physical specification of the PC Card standard. The cartridge may be conventionally shaped like a PC card with 68 connectors for certain applications. Similarly, a complementary handset socket may be also configured as a PC card socket. The pin assignments for the wireless communication cartridges provided herein may be therefore mapped according to industry PC standards or selected manufacturer specifications. Whereas there are many advantages for the cartridge to substantially conform to PC Card standards, there may also be disadvantages. The PC Card standard forces the cartridge to contain an antenna internally, and does not allow the cartridge to use an antenna in the handset. This is important when the handset is a transportation vehicle that can supply a much more powerful antenna than can the cartridge. The PC Card is an expensive interface to support because there are multiple data and address pins required. The PC Card standard does not support analog communications between the handset and the cartridge, and therefore requires the handset to digitize all voice signals even if they do not need to be digitized, as is the case with AMPS cartridges. The PC Card standard does not provide for separate communication pins for voice and data signals, making it difficult to build a handset with both voice and data capability. Finally, the PC Card standard forces the cartridge to take a form factor that may be too wide for some handset applications.

Figure 3A:
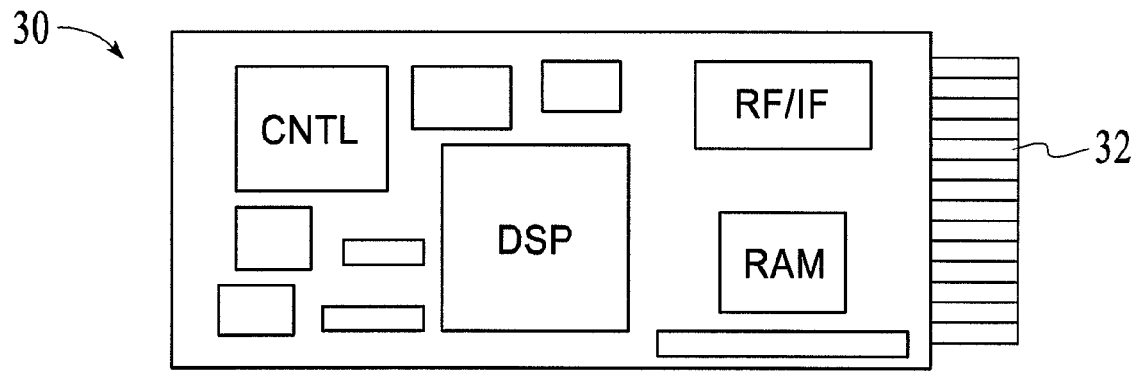
FIG. 3A describes a removable cellular telephone system cartridge that is a printed circuit board with integrated circuits that are not enclosed in a protective housing.

FIG. 3A is another embodiment of the invention that provides a removable cellular telephone system cartridge 30 that is provided as a printed circuit board with integrated circuits that are not enclosed in a protective housing thus revealing the internal electronic components. A cartridge for the flexible wireless telephones described herein may in fact entirely lack an enclosure or external casing. The cartridge may include partially exposed portions or sections encased with substantially transparent material. These outwardly visible systems may include the control system, the digital signal processor (DSP), the RF/IF system, or even the RAM components for storing relevant information. The contact points 32 provided by the circuit board construction may communicate with a handset. As with replaceable computer motherboards or printed circuit boards, a case less cartridge has particular advantages such as providing a lighter weight, smaller, or more economical component. However, this configuration may provide less protective covering than desired for certain applications, and may present a more delicate installment or connection process. Upon installation within a handset, the casing of the unit may provide containment and sufficient covering.

Figure 3B:
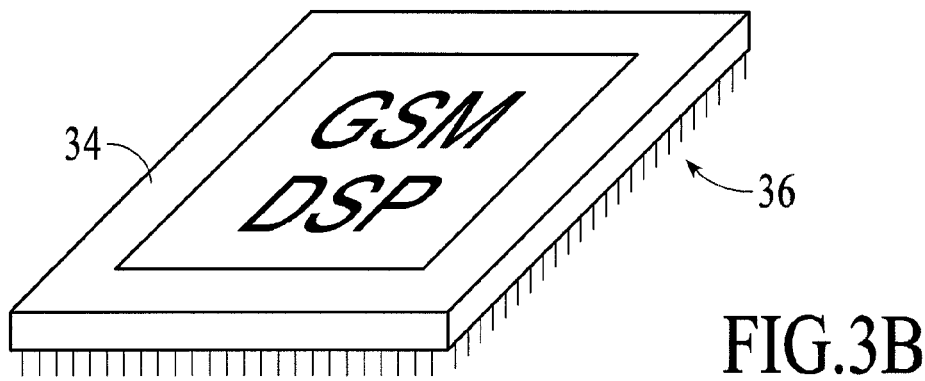
FIG. 3B is a simplified perspective of a removable system cartridge that is formed as a single GSM integrated circuit.

The interchangeable wireless system cartridges provided in accordance with the invention may be also formed as a removable single integrated computer chip 34 as illustrated in FIG. 3B. The integrated circuit 34 for supporting wireless communications within a GSM system, for example, may be removably detached from a handset directly or even from another cartridge as a sub-assembly. Moreover, each subsystem including the digital signal processor (DSP) may be individually updated or replaced in the flexible handsets or cartridges described herein. A complete wireless communications integrated circuit kit with appropriately selected components may be provided for upgrading a configurable wireless communications device. The kit may include a modular integrated circuit having a plurality of wireless electronic components that provides an upgraded set of predetermined features within at least one wireless communication system. The computer chip 34 may be formed with an interface 36 configured for connection with a wireless communications device that supports the operation of the set of predetermined features provided. The kit may further include instructions to upgrade the configurable wireless communications device by connecting the modular integrated circuit to the device. The microprocessor component or any other component may include an individual or set of removable integrated circuits or computer chips that perform a range of functions. The desired functionality within a particular standard may be therefore provided on chip sets or a single IC that can be readily replaced. For example, to change from one digital system to another, a selected or minimal number of components may be replaced such as the digital signal processor or read-only memory. Increased flexibility and robustness for the wireless telephone may be increased by configuring the unit to include more removable wireless components to even permit significant alterations such as switching between analog and digital systems.

Figure 3C:
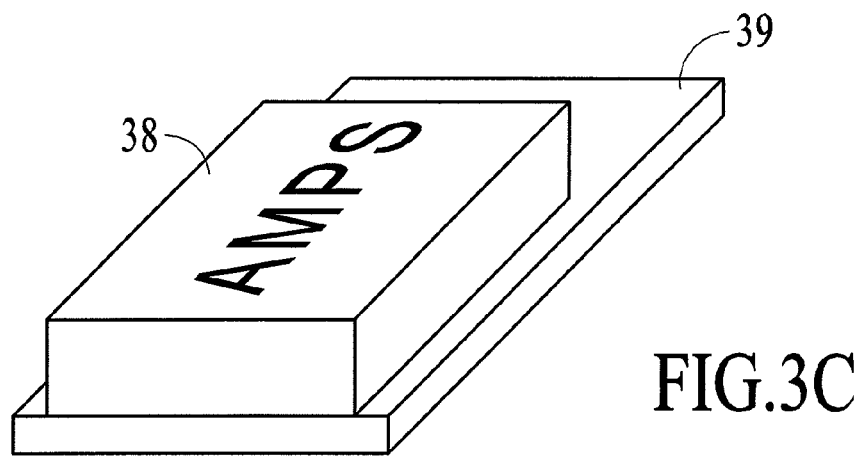
FIG. 3C is a simplified perspective view of a system cartridge provided with a PCMCIA Type III or other PC card configuration.

FIG. 3C provides another embodiment of a system cartridge 38 formed in accordance with the invention. The cartridge 38 may include wireless componentry within a Type III or other type of PC Card with the same mechanical specifications. Although PCMCIA standards are widely followed in the industry, other cartridge configurations may be devised to promote the flexibility of the wireless handsets provided herein. The PC card implementation, however, offers many unique advantages PC cards and PC card sockets are currently available as standard off-the-shelf parts. Moreover, the different number of PC card type configurations provide a range of sizes for the cartridges to contain selected wireless electronics in a PC card for a system such as AMPS, an appropriate number of pins or connections in the PC Card standard for signals and controls. In order to reduce the risk of confusion between telephone and computer PC cards described herein, it may be more convenient to modify the casings or coverings for the removable wireless units to include unique slots or grooves 39 to minimize unintended connection directly with a computer.

Figure 4:
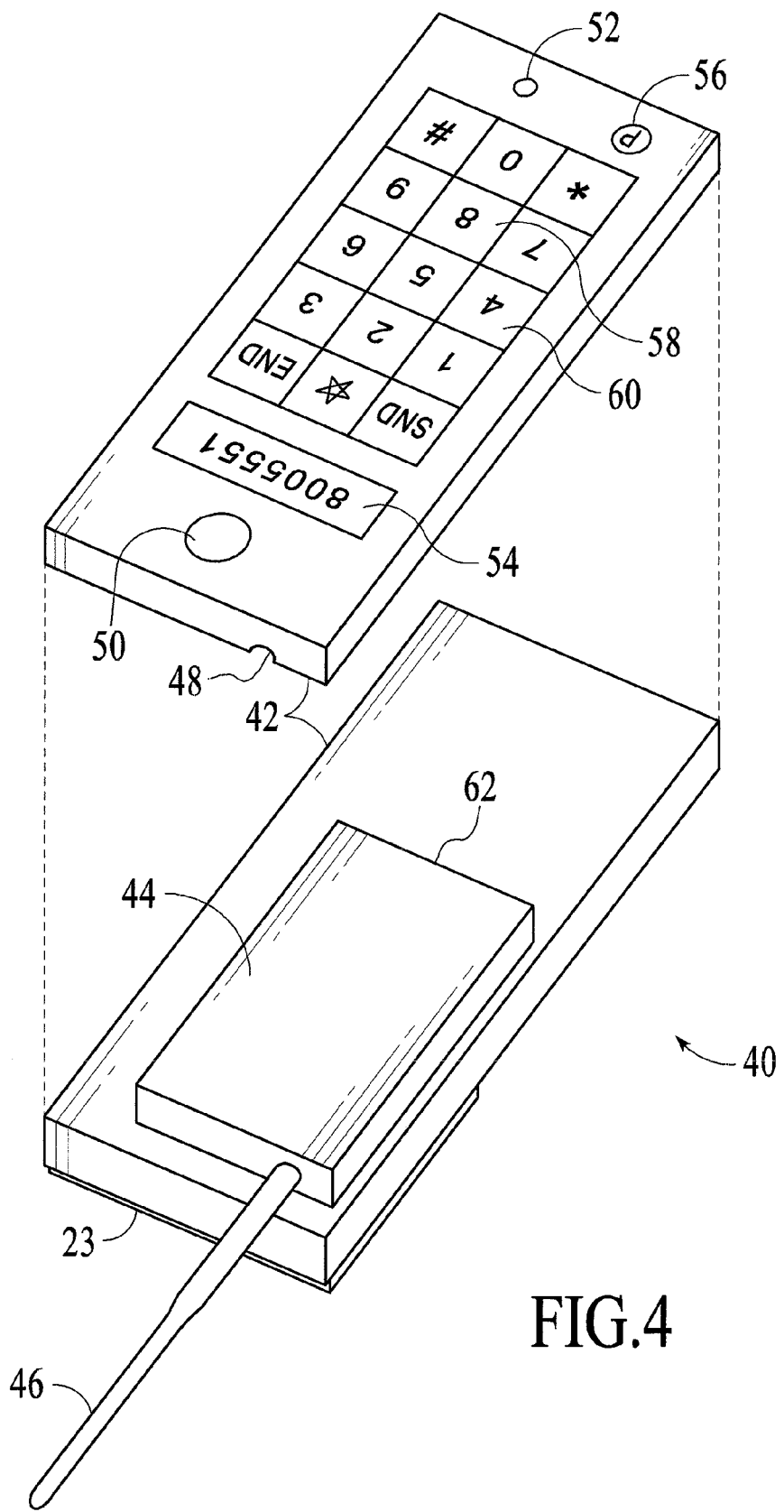
FIG. 4 is an exploded perspective view of a cellular telephone handset with an internally mounted cartridge formed with an antenna extending beyond the handset unit.

Another variation of the invention provides a wireless cellular telephone handset 42 that includes an internally mounted cartridge 44 as shown in FIG. 4. The internal replacement provides a cartridge 44 that is ordinarily hidden from view while the antenna 46 connected to the cartridge may be allowed to protrude from the handset 42. The antenna 46 may be also formed as part of the cartridge 44, and the handset 42 may include an opening or hole 48 to permit the antenna to protrude through the casing or housing of the handset. For this flexible wireless telephone design, the user may disassemble or take apart the handset 42 to replace the cartridge 44 Although this configuration may require more time to effectuate a cartridge exchange or update, it may create a more aesthetically pleasing handset 42 exterior with simpler lines. This design for the cartridge 44 and handset 42 may be particularly useful when the cartridge is only replaced once every few years. Another variation may provide a hybrid design that is a combination of internal and external configurations. The physical appearance of the handset 42 may be similar to any wireless telephone available today. It may include a variety of components such as a speaker 50, a microphone 52, a display 54, a power-button hard-wired control 56, and a keypad 58 The handset 42 may also contain various types and numbers of controls and keys 60. A variety of subsystems or wireless communication components may be further selected in the handset 42 including a microcontroller or a microprocessor, and a memory storage with a computer operating system. Moreover, a battery 62 may be detachably connected to the handset 42. The battery 62 may include power-level indicators and appropriate charge monitor circuits The basic cellular telephone speaker 50, microphone 52, and keypad 58 components may be supplemented with more advanced or sophisticated componentry, and may implement various design specifications including the IEEE 1394 firewire standard or the Universal Serial Bus standard for communications The internal electronics of the wireless telephone 40 may be housed within a removable cartridge 44 which can be slipped in and out of the handset 42. The handset/cartridge interface may include a socket, and may operate to connect the cartridge 44 with the handset 42. The socket may hold the cartridge 44 relative to the handset 42, and may guide the cartridge to the pins at the back of the interface The shape of the socket may also prevent the cartridge from being inserted in the wrong way.

As illustrated in FIG. 4, a modular cellular telephone cartridge may be internally positioned within the handset. The handset and cartridge together may be provided as a kit with a set of instructions for changing a set of selected mobile telephone features or a network system by selecting different modular cellular telephone cartridges to the handset. The handset may thus gain improved or expanded functional capabilities when matched with different cartridges. The cartridge may have wireless communication components that provide a set of selected mobile telephone features for at least one cellular telephone system. A cartridge interface may be formed for communication with the handset interface to support the operation of the wireless communications component for selected cellular telephone systems. The handset may include at least one wireless communication component that supports the functionality provided by the cartridge and set of selected mobile telephone features for at least one cellular telephone network system. The handset may incorporate an interface or socket that is designed for connection to a matching cartridge. The socket may include the handset/cartridge interface. The socket in the handset may be in some respects similar to a PC card slot on a portable computer or a game cartridge slot on a home game machine. Although the cartridge may be physically similar to a PC Card or a game cartridge, it may actually contain internal electronics that are made for wireless telephones. A section of the socket may include the handset/cartridge interface which may in turn include appropriate pins for connection with the cartridge. The socket and cartridge may be shaped to prevent incorrect insertion of the cartridge. The interface or a socket connection in the handset may be also configured for connection to a plurality of modular cellular telephone cartridges each having a plurality of electronic wireless communication components that provide a set of selected mobile telephone features. The interface may substantially comply with PC Card standards established by the PCMCIA such as a Type III slot. The interface may provide for a coaxial pin for connection to an antenna on the handset, and may provide hardware and software protocols the handset and cartridge can use to negotiate operating characteristics based on the capabilities of the handset and cartridge. A plurality of interfaces may be formed in the handset that are configured as sockets for connection to PC cards, wireless component cartridges, smartcards, or any other attachment including an infrared port for infrared communications.

The universal wireless cellular telephone handset shown in FIG. 4 may be configured for a variety of operating features with detachable or hardwired peripherals. The handset may include a keypad consisting of physical depressible keys or a touchscreen display of key images or icons that are provided by a computer. Additionally, the handset may feature a wide variety of displays including active matrix displays. The handset may further include a data exchange interface for communication with other wireless or non-wireless devices. For common cellular telephone applications, the handset may have interfaces that are configured for use with hands-free cellular telephone accessories, particularly for operation in moving vehicles such as automobiles.

Figure 5:
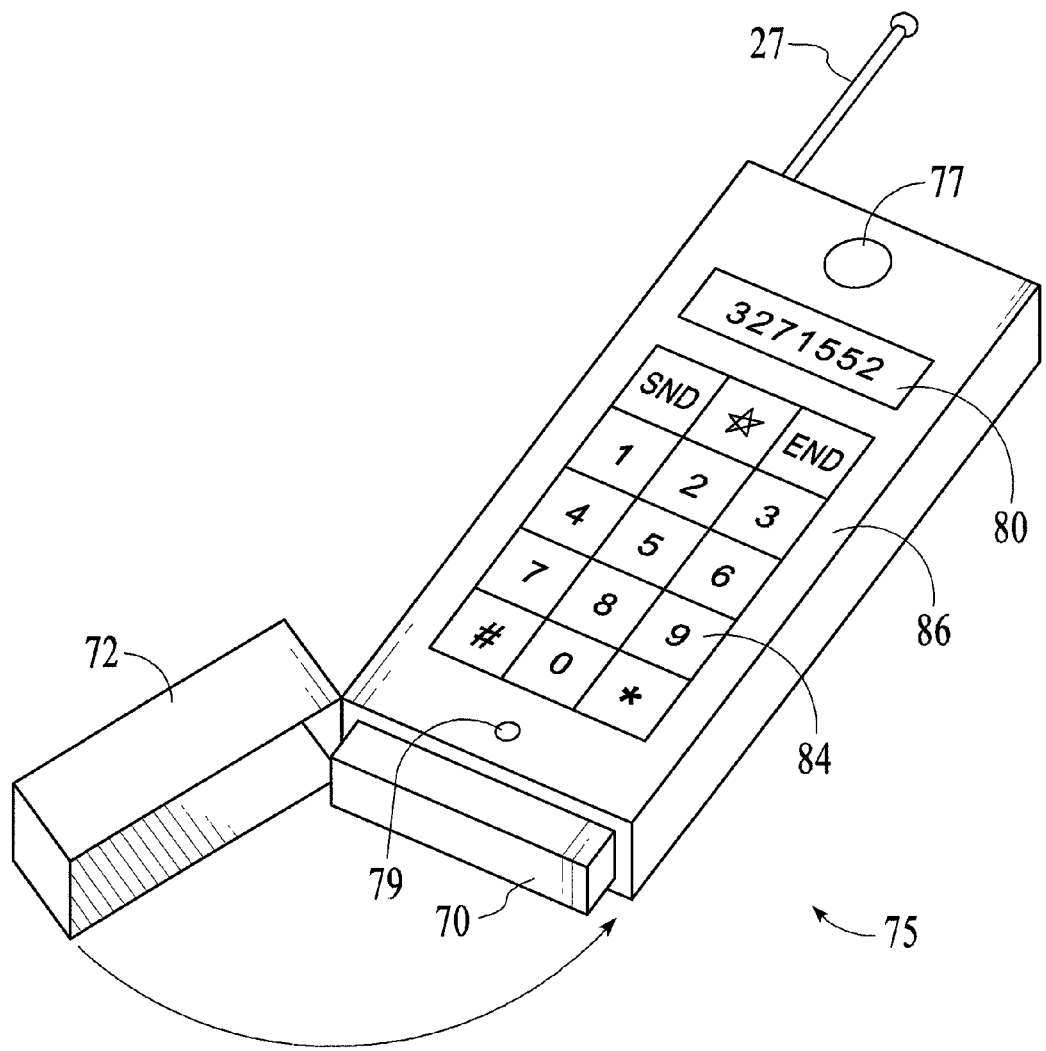
FIG. 5 is a simplified perspective view of a flexible wireless telephone with a hinged cover that provides convenient access to a modular wireless system cartridge that may be hidden from ordinary view so as to avoid taking apart the handset by swinging open a panel or cover to gain access to the cartridge.

As shown in FIG. 5, flexible wireless telephones provided herein may be formed with a hinged cover that provides convenient access to an enclosed modular wireless system cartridge 70. The cartridge 70 may be hidden from ordinary view and may be replaced or changed by simply swinging open a door or panel 72 to gain access to the cartridge so as to avoid taking apart the entire handset 75 Additionally, this architecture may be similar to currently available PC card devices and game cartridges Although the cartridge 70 may be hidden from view when positioned inside the handset 75, a trap door or easily removable section 72 of the handset may allow easy access to the cartridge for quick replacement. The handset 75 may be both aesthetically pleasing and permit easy replacement of the cartridge 70. Furthermore, upgrades may be readily performed without complicated equipment and highly technical personnel. The step of upgrading or reprogramming the flexible wireless cellular telephones described herein may be accomplished with a kit comprising a wireless communication handset having a first set of wireless communication components that support a cellular system. A handset interface may be included that is connected to or in communication with the set of wireless components In addition, the kit may include a first modular cartridge that also has a second set of wireless communication components that provide a first set of wireless communications features for a first cellular system. The first cartridge may be formed with an interface in communication with the second set of wireless communication components configured for removable connection to the handset interface The kit may further include a set of instructions for reconfiguring the wireless communication handset. For example, a second modular cartridge having a third set of wireless communication components may provide a second set of wireless communications features for a second cellular system. The second cartridge may be formed with a second cartridge interface in communication with the third set of wireless components, and may be configured for removable connection to the handset interface. The first modular cartridge may be disconnected from the handset by separating the interface connection between the handset and the first cartridge. The first modular cartridge may even be disconnected from the handset when the handset is powered on. The second cartridge may be thereafter connected to the handset through the interface connection between the handset and the second cartridge. The second cartridge may even be connected to the handset when the handset is powered on. The first and the second set of wireless communications features may be the same or different, and may also provide the same or an updated featureset In the event an operator elects to revert back to a previous system, switching back to the earlier system merely involves re-using the original cartridge in the handset. This allows a user to easily switch to a GSM system while staying in Europe, for example, and flexibly operate within an AMPS wireless system when traveling in the United States. During each occasion, the same handset with the same stored information may be used. Moreover, when the user elects to access more features supported by a current wireless telephone, the user would not necessarily purchase another telephone. The user may simply select a replacement cartridge that provides the wireless telephone with an expanded featureset. As described above, a multi-system cartridge may be also provided that supports more than one wireless system. When a wireless service is available for two different systems or more, as with available dual mode telephones, one or more cartridges that support additional systems may be provided. Multi-system cartridges may be particularly useful for users who travel frequently between two or more different systems. A pre-paid wireless cartridge may also be provided. The user need not apply for a subscription service on a particular network system, but may instead buy a pre-paid cartridge for the system and use the minutes already bundled with the cartridge. This relatively straightforward replacement of cartridges with the apparatus provided herein may readily support one or two systems at any given time.

The flexible handset 75 shown in FIG. 5 may include numerous components such as a speaker 77, a microphone 79, a display 80, a power button hard-wired control, a keypad 84, and a battery Each of these components may be mounted to the handset case or body 86, and may be electronically connected to the handset/cartridge interface (not shown). The speaker 77 may be mounted to the handset 75, and be assigned or connected to $OUT_1$ and GND pins located within the handset interface The speaker 77 may include a variety of sound emitting components that are compatible with existing wireless telephone handset designs or systems including the Phillips TDA 7050T chip as described in available literature such as the Phillips Data Handbook IC1 The TDA 7050T may be located inside the cartridge, and may be connected to pins such as $OUT_1$, $OUT_2$ and GND. The microphone 79 may also have two connections leading to or within the interface, and may be connected to the $IN_1$ and GND pins. The microphone 79 may include a variety of sound receiving components that are compatible with existing wireless handset designs as described in industry literature such as the Phillips Data Handbooks. In addition, a Phillips SA5752 chip may be located on the cartridge 70 and may be connected to appropriate pins such as $IN_1$, $IN_2$, GND, microphone gain control, and VOX output The display 80 may be a liquid crystal display (LCD), and may be connected to a LCD display controller within the Phillips PCF2116 family in a manner known to those of ordinary skill in the art as described in the Philips technical handbooks. The controller may have at least six connections to the interface such as SCL, an $I^2C$ bus line that is connected to the SCL pin on the interface, SDA, an $I^2C$ bus line that is connected to the SDA pin on the interface, $V_o$, $V_{LCD}$, $V_{DD}$, and $V_{ss}$ which are calculated according to well known techniques, and are attached to the appropriate voltage pins on the interface. These voltages may be supplied by a power management component in the cartridge. The power button hardwired control may be connected to the Power Toggle pin, which may in turn be connected to the power management component that switches the telephone on and off. In addition to these and other traditional cellular telephone functions, the keypad 84 may be used to enter instructions into the handset 75 These instructions may be a telephone number or a command to access a function. The keypad 84 may operate as a PC/AT keyboard with relatively fewer keys, and may be capable of sending PC/AT keyboard signals to the interface according to the particular keys pressed.

Other flexible wireless telephones formed in accordance with the concepts of the invention may further contain a plurality of ports for multiple cartridges. The handset interface of a wireless communication handset may be configured for removable connection to a plurality of modular cartridges. One or more cartridges having the same or different configuration may be connected to the handset unit simultaneously as desired. The handset may be formed with multiple sockets for multiple cartridges. Additionally, a cartridge may be separated or figuratively broken into two or more cartridges. Multiple cartridges may allow more flexibility in replacing components. Selected sections or parts of the internal electronics may be replaced instead of a whole section. For example, one section may contain the RF/IF electronics, and the other may contain remaining internal electronics When a different wireless system only requires that the RF/IF electronics be replaced, the price of converting to this system may be less because the RF/IF-only cartridge would be replaced and would have fewer components. These and other advantages may be provided by the overall flexible wireless architecture provided herein. The handset may further include additional ports for additional removable components which may contribute to a relatively larger and even more flexible portable unit.

Figure 6:
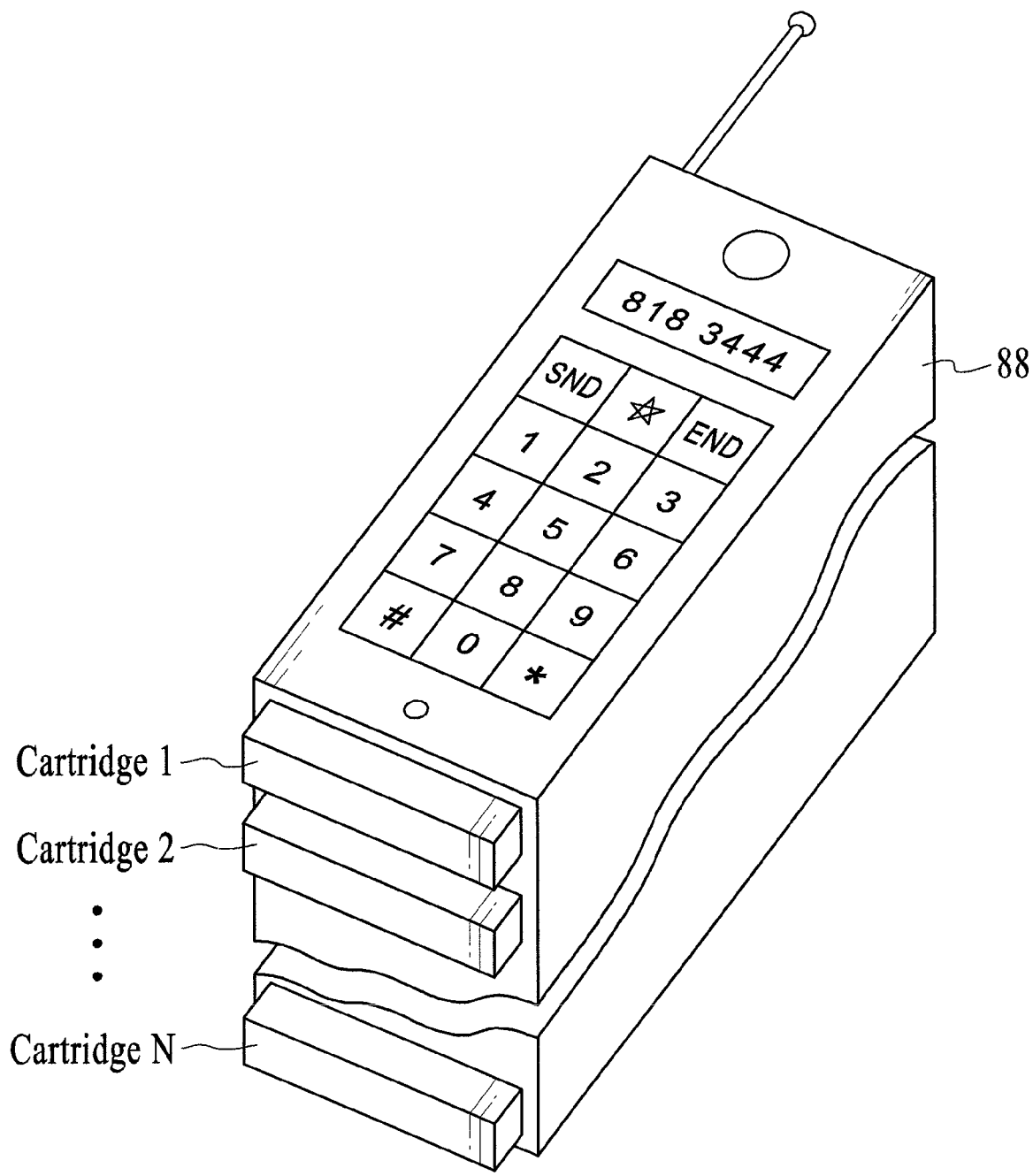
FIG. 6 is a simplified perspective view of a flexible wireless telephone formed in accordance with the invention that contains a plurality of ports for multiple cartridges.

As shown in FIG. 6, a plurality of 1 to n cartridges (n>1) may be connected to a handset 88 formed with a number of slots for simultaneous or selected connection to numerous cartridge interfaces (not shown). This concept can be further extended to n cartridges in one wireless telephone wherein n sockets are built into the wireless telephone For each handset socket or slot, a variety of pin configurations may be selected. The handset may include a keypad assigned with a five connector configuration: Reset, $V_{ss}$, Data, GND, and Clock Interrupt The Reset connector may not be necessarily used, and the $V_{ss}$ may be connected to an appropriate voltage pin (or pins) on the handset interface. Also, the Data connector may be connected to the keypad Data pin on the handset interface, and the Clock may be connected to the keypad Interrupt pin on the interface. A Phillips 87C751 microcontroller chip or similar control circuit may be placed in a cartridge, and may be connected to the Data and Interrupt pins. The 87C751 and other compatible controllers may convert PC/AT-type keyboard signals to Phillips $I^2C$ bus signals. The bus signals may be thereafter sent to the main microcontroller This conversion and signal transmission may be accomplished in accordance with known techniques, and in conformity with accepted industry standards such as those described in available Phillips manuals Furthermore, a battery may be included in the handset unit with a display to indicate battery level. A smart battery may be also selected for the handset, and may have separate contacts for connection to an electrical charger. The smart battery may further contain circuitry to monitor the battery, regulate charging, and display battery levels. A computer chip such as the Phillips SAA1500T may be used to perform these and other functions as described in the known literature such as Phillips handbooks. The battery may be generally responsible for battery management in the wireless telephone, and may be connected to the handset interface at three pins: positive, negative, and reserved. More pins may be required depending on the power requirements of the cartridge. These connections may directly lead to the power management component in the cartridge. The power management component of the cartridge may control or supply power to the telephone, and may receive power directly or indirectly from a smart battery component in the handset. Useable power may be thus delivered by the power management component to other cartridge components and the handset via various interface pins. It may also contain automatic power-off capabilities. In addition, an antenna may be also included as another separate or integrated cartridge component. The handset interface may also include $ANT_1$ and $ANT_2$ pins that are reserved for future versions of the flexible wireless telephone which may have different designs which may also include an antenna in the handset. In this configuration, two pins may be used to communicate with the cartridge. The antenna may be connected to the antenna hardware in the cartridge through the $ANT_1$ pin, which in turn, may be connected to a Phillips SA601 (or SA611, SA620, or SA621) and a transmission amplifier. These antenna pins may also be in the form of a coaxial connector for better antenna efficiency The antenna hardware may include a duplex filter, impedance-matching componentry, and optional diversity electronics. The duplex filter may bandpass frequencies in the 824-849 MHz and 869-894 MHz ranges for transmission and receiving so that one antenna may be used for both sending and receiving signals. The antenna may be tuned for these or other selected frequencies. It may be further possible to use two antennas to implement additional signal diversity.

The concepts provided herein may be generally applied to numerous wireless voice and data communication systems. While many of the illustrated embodiments are directed to wide-area voice devices such as cellular telephones, the invention may be equally applied to cordless telephones. The invention is further applicable for satellite-based telephone systems that are becoming more accessible to the general public for communicating anywhere around the world. These devices which presently cost approximately $3,000 may enjoy a much longer useful life and greater appeal when modified in accordance with the architecture described herein to operate within different wireless systems with higher data rates, and upgradeable featuresets. Similarly, data transmission devices such as pagers or modems may be configured as provided herein to provide a more flexible wireless device and system. The invention is applicable to devices with wireless communication systems in general. For example, the flexibility provided by the invention may be applied to smartphones, personal data assistants (PDAs), or transportation vehicles that operate within different systems or standards.

Figure 7:
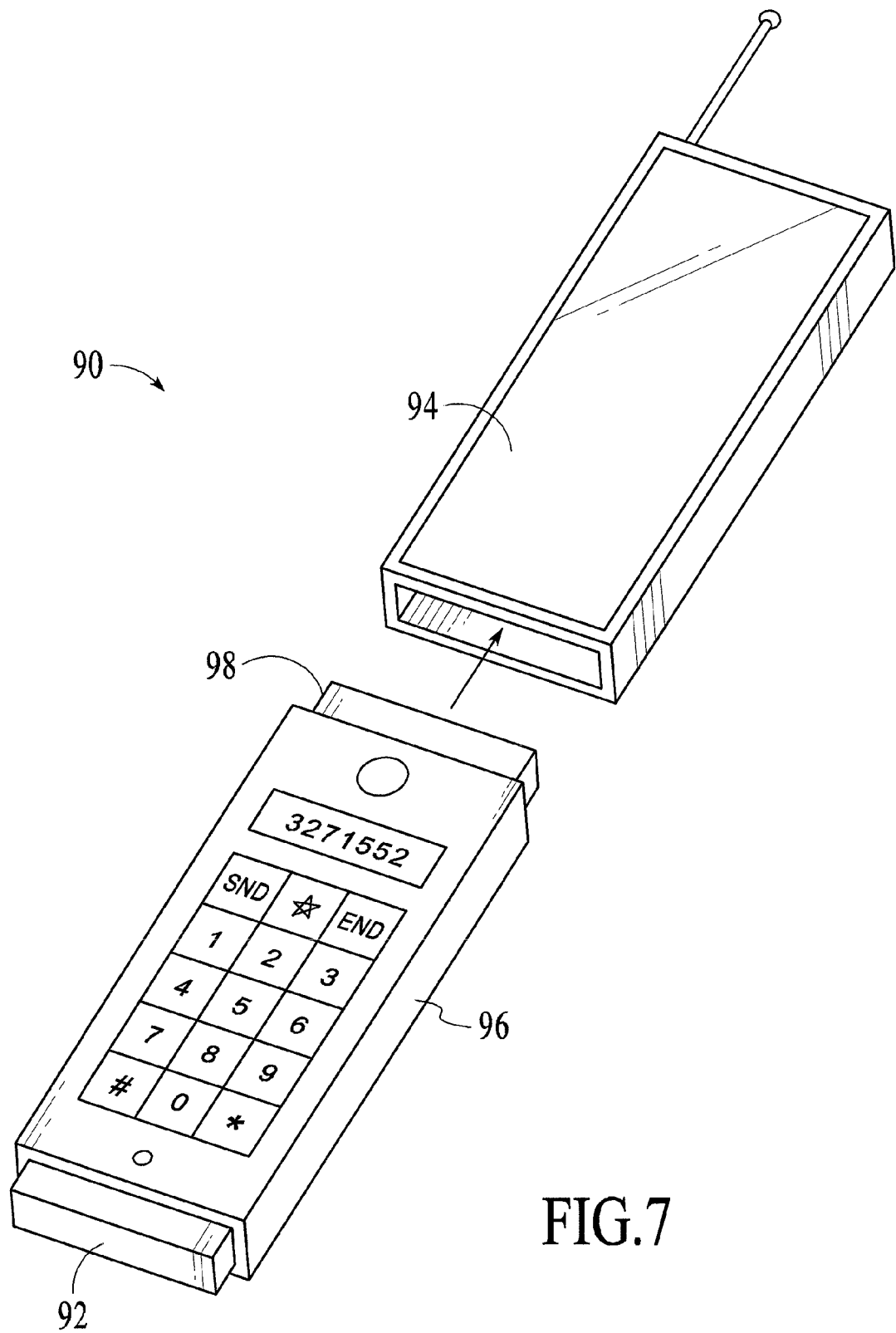
FIG. 7 is a flexible modular smartphone with a large touchscreen and cartridge provided in accordance with another aspect of the present invention wherein the unit may be divided into two separate components
Figure 8:
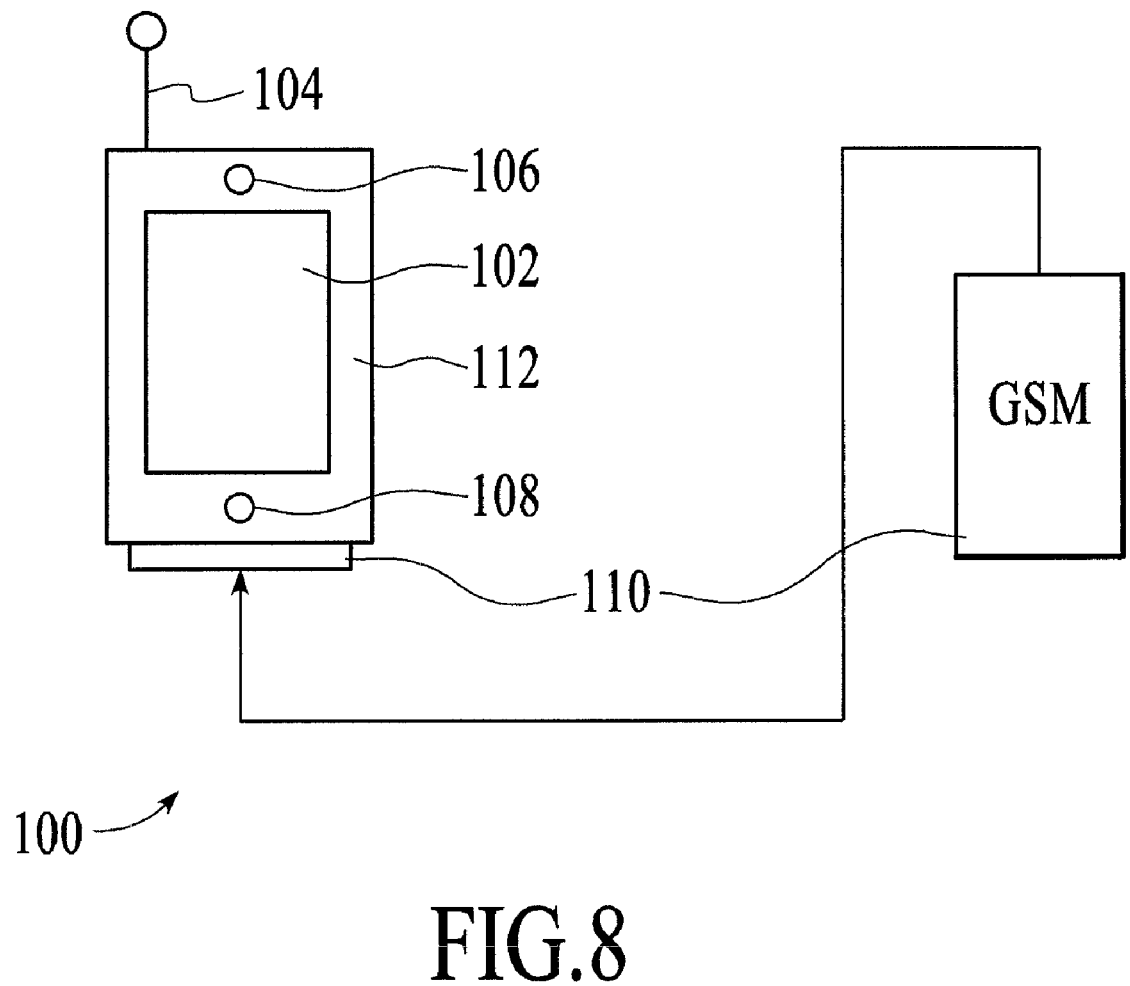
FIG. 8 is another embodiment of the present invention which is a flexible wireless PDA with a cartridge that operates with at least one selective wireless system such as GSM

FIG. 7 provides a flexible smartphone 90 with a large touch-screen that includes a removable system cartridge 92. Other embodiments of the invention may include a flexible wireless telephone architecture for a variety of smartphones such as the Nokia 9000 Communicator. Smartphones may be generally described as a wireless telephone that may also provide organizer functionality such as a datebook, a contact manager, a to-do list among other applications, and access to wireless services such as those on the Internet. A smartphone offers many current and future functions as a hand-held computer and a wireless telephone that are basically combined into one unit. They may be essentially considered an advanced wireless telephone in some respects, and may be modified in accordance with the invention. Flexible smartphones 90 possess many of the advantages of a flexible wireless telephone as described above plus the added functionality of computer-like operations. Despite their typically large sizes when compared to wireless telephones, a modular cartridge 92 and interface may be established between the internal and external components of the unit to provide a flexible electronic device that supports universal operation within a variety of different wireless systems. In order to further the modularity of a flexible smartphone 90 or wireless telephone, the handset portion may be further divided into several removable parts. Any variety of peripherals or additional computer accessories or devices may be added to a basic handset unit which may be supported by one or more modular cartridges that includes the internal electronics operating on at least one wireless standard. For example, a handset may include a detachable display 94 or a keypad 96. The screen 94 may be removably connected by a connector 98 to a telephone keypad section 96 that includes a wireless system cartridge 92. The modular cartridge 92 may be connected to any section of the device which may be simply an integral unit that does not include detachable peripherals or accessories Other universal wireless voice communication devices may also include a wireless communication handset having a first set of wireless communication components that supports a selected wireless communication system. The unit may include a handset interface connected to or in communication with the first set of wireless communication components. Moreover, the handset interface may be configured for communication with one or more modular cartridges Each modular cartridge may have a second or another set of wireless communication components that provides a set of wireless communications features. The cartridge may further include an interface in communication with the second set of components that is removably connected to the handset interface. The connected interfaces may provide a shared coupling or access between the first and the second set of wireless communication components. The handset may also include a moveable cover to retain and conceal the cartridge within the handset. The modular cartridge may include at least one microcontroller for controlling the wireless communications device, or at least one integrated circuit selected from the group consisting of digital signal processor integrated circuits, read-only memory integrated circuits and flash-memory integrated circuits. A wide variety of wireless communications subsystems may be included within the cartridge such as an integrated RF or baseband processing subsystem, or a voice processing or power management subsystem that may control a smart battery in the telephone that provides a controlled power source to the communication device. The universal wireless voice communication device may have a modular cartridge and wireless communication handset interfaces that are configured to substantially or exactly conform with a selected PCM-CIA standard FIG. 8 is another embodiment of the present invention that provides a flexible personal data assistant (PDA) 100. In addition to performing conventional telephone operations, a PDA 100 may include electronic components to help manage personal information as a personal organizer in a manner similar to a smartphone. The PDA 100 usually includes a screen 102 for displaying information, and supports various operating systems. The user interface of the telephone may be of any kind including a menu-driven interface The display 102 or user interface may employ various display technologies including LCDs, flat panel LCDs including active matrix LCDs such as thin film transistor (TFT). The body 112 of the unit may otherwise include conventional wireless components such as an antenna 104, speaker 106 and microphone 108 The unit 100 may further include a wireless communications cartridge 110 that supports at least one preselected wireless standard, and a compatible interface (not shown) for its removable connection to the body of the unit. The unit may be configured as a mobile wireless telecommunication device with a modular cartridge that includes a first set of at least one electronic wireless communications component that provides a set of selected features for at least one wireless communication system, and a wireless communication handset with a second set of at least one electronic wireless communications component formed with a handset interface configured for a plurality of modular cartridges in communication with the modular cartridge to provide access to the first set of at least one electronic wireless communications component. The wireless telecommunication device may be a voice communication device for operation in a cellular telephone system, or a data exchange device such as a pager The cartridge electronics may support operation of the device within a wide-area or local-area network capable of exchanging transmission of voice, video and data signals.

Figures 9, 10:
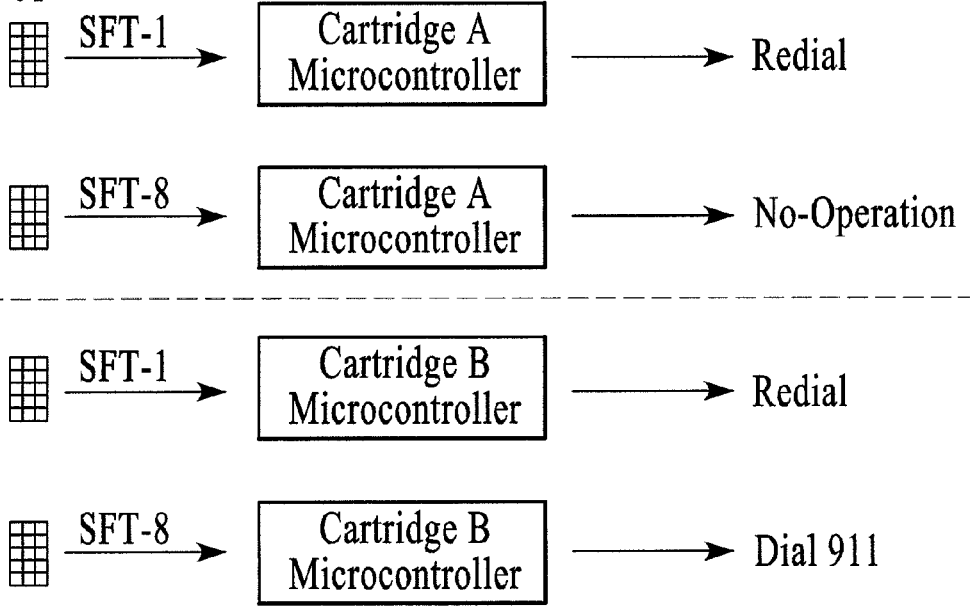
FIG. 9 is a simplified front view of a wireless telephone keypad for a flexible cellular telephone that supports expandable featuresets
FIG. 10 is a simplified flow chart illustrating how a system cartridge formed in accordance with the present invention may expand the existing featureset of a flexible wireless telephone

FIG. 9 provides a wireless telephone keypad that may be selected for use with any of the flexible devices described herein. The illustrated keys may be supplemented with additional keys to support a variety of expandable featuresets for the unit. The handset keypad may permit a user to enter numbers or instructions with send (SND), end (END) or shift (SFT) keys that are received and processed by the wireless telephone These instructions may include telephone numbers or commands. A flexible wireless telephone keypad may perform many functions similar to keypads used in traditional wireless telephones, and may further include added advantages in accordance with the invention For example, the flexible wireless telephone keypad may relay instructions to perform useful functions and may further relay instructions that may seemingly provide no discernable function As shown in FIG. 9, the SFT key may operate much like an option key on a computer keyboard. Pressing the SFT key followed by any number 1 through 6 may activate particular functions within a cartridge such as displaying battery life, signal strength or memory recall, engaging or disengaging a handset lock, selecting a vibration or ringer mode, or verifying a telephone handset number, respectively. Meanwhile, pressing SFT followed by 7, 8, or 9 may perform or activate other functions or otherwise do nothing until selected for use with a future upgrade. A user may however replace the cartridge with another having a different or the same featureset, or with a more advanced version of software to perform new functions supported by the replacement cartridge and the telephone. The first cartridge may ignore a SFT 7 signal, whereas the replacement cartridge may recognize it and perform newly added functions such as dialing "911" or other preprogrammed features supported by the cartridge Another aspect of the invention thus provides methods for reconfiguring a flexible wireless communication device by initially selecting a wireless handset having wireless communication componentry in communication with at least one handset interface and a first removable wireless communication cartridge with a first set of preselected features for a first wireless communication system that is removably connected to the handset through the at least one handset interface. The first removable wireless communication cartridge may be disconnected from the at least one handset interface. A second wireless communication cartridge may be selected with a second set of preselected features for a second wireless communication system that is configured for connection with the at least one handset interface. The second wireless communication cartridge may be connected to the at least one handset interface to reconfigure the flexible wireless communication device for operation with the second wireless communication cartridge. Moreover, a plurality of wireless communication cartridges may be removably connected to additional handset interfaces formed within the wireless handset. One or more cartridges may be also selected that conform with preselected configurations or established standards. Replacement cartridges may include electronic components that support the same or different wireless communication systems. The division of components between the cartridge and the handset may be completed in order to reduce or minimize the number of identical components in a cartridge that is replaced particularly for relatively simple service upgrades within the same wireless system. Similarly, the replacement cartridge(s) may provide the same or different set of features according to the same or different wireless standard.

As shown in FIG. 10, multiple cartridges formed in accordance with the invention may effectively expand the featureset of a flexible wireless telephone. This variation of the invention also provides methods of upgrading cellular telephones wherein the handset is connected to a first removable cellular telephone cartridge with electronic wireless components that provide a pre-existing set of features for a particular wireless system. The first removable cellular cartridge A may be disconnected from the cellular telephone handset. The first removable cellular telephone cartridge A may be replaced with a second removable cellular telephone cartridge B with electronic wireless components that provide an upgraded set of features for the wireless system. These steps may be reduced to a set or sheet of instructions, and may be packaged with the apparatus as a kit or system. For example, the keypad may send an appropriate signal to the interface to cartridge A when a SFT 1 command is entered by a user via keypad data and keypad interrupt pins to perform a redial function. Pressing SFT 8 may provide no function within cartridge A, and may correspond to reserved signals for future use The microcontroller within the unit receives relayed keypad commands and performs a function or ignores the signal depending on whether the cartridge supports the keystroke The substitute cartridge B may provide a new set of features either within the same or a different wireless system. The substitute cartridge B may continue to perform a redial function when SFT 1 is pressed, and may now perform a new function such as dialing "911" when SFT 8 is pressed. The particular details as to the connection and interaction between the signals of the electronic components are well known to those of ordinary skill and may be described in the literature such as the Phillips data handbook which is incorporated by reference in its entirety herein.

Figure 11:
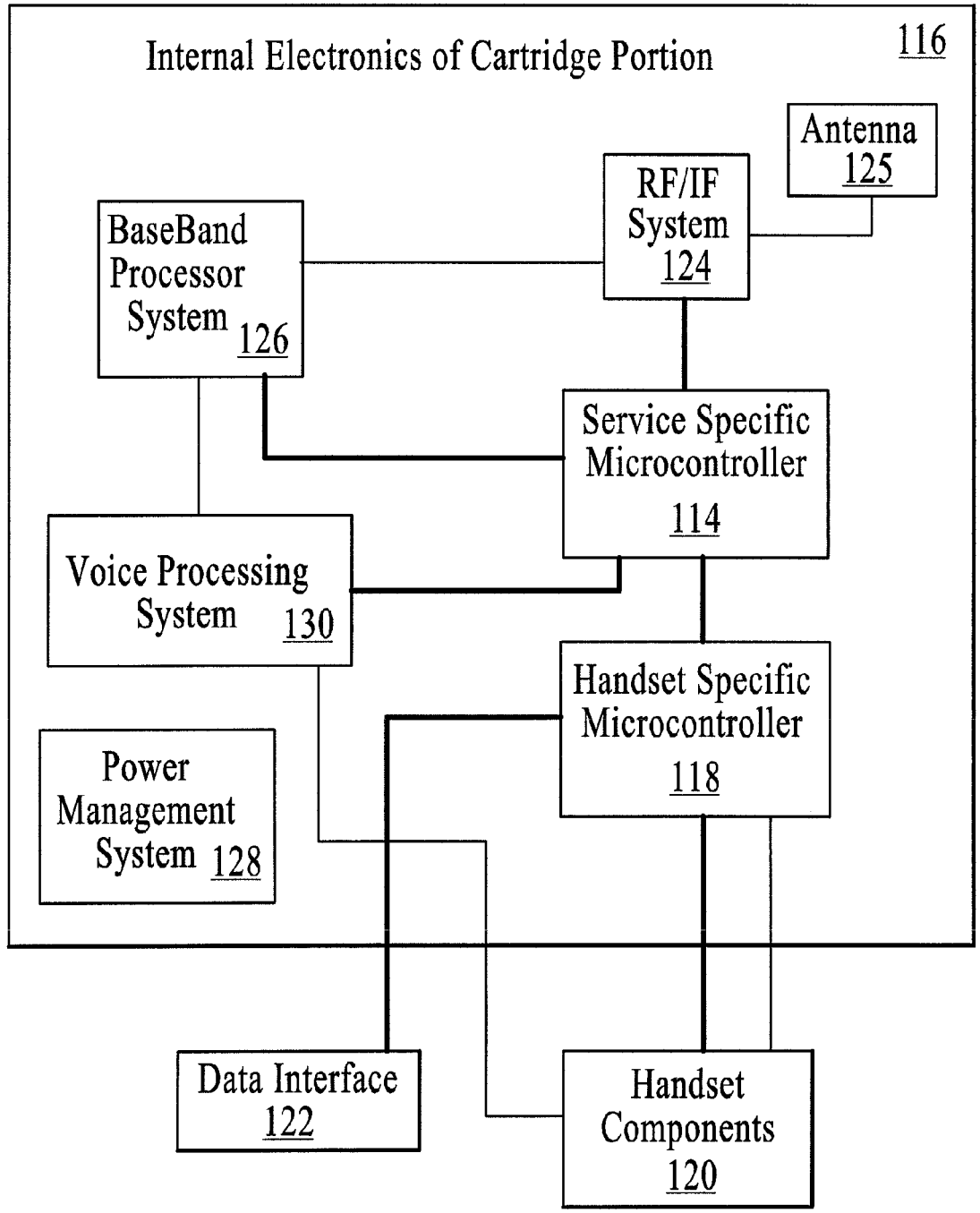
FIG. 11 is a block diagram generally illustrating the internal electronic components of a cellular telephone cartridge and unit

FIGS. 11-15 illustrate various relationships between different components within the handset and cartridge(s) provided herein These components may be divided differently among the handset and cartridge in preselected groups for flexible operation of the wireless communication devices including but not limited to cellular telephones. FIG. 11 provides a block diagram generally illustrating the internal electronic components of a wireless communication cartridge unit This simplified diagram may include representations of additional cartridge subsystems and components. Any number of wireless semiconductors may be selected for the cartridge which includes components found in common wireless communication subsystems for many wireless standards Regardless of the particular implementation or communication system, wireless devices such as cellular telephones share common functionality that enables transmission of information such as voice or data For example, when an operator speaks into the handset, a microphone in the handset converts the sounds to an electronic signal. The electronic signal may be directed to the voice processor component (VPC) within a voice processing sub-system 130. The VPC filters the signal and sends it to the baseband processor component (BPC) with a baseband processor sub-system 126 which processes the signal for modulation. The signal is thereafter passed to the RF/IF component for actual modulation The signal is eventually passed to the antenna which converts the signal to radio signals. When radio waves are received by a telephone, the antenna of the handset generally transfers the radio signals to the RF/IF component The RF/IF component filters the signal and demodulates it for the BPC. The BPC may perform the processing and the decoding of the incoming baseband signal, and subsequently pass it to the VPC. The VPC performs equalization and other modifications to the signal to make the signal recognizable. The speaker converts the signal from the voice processor to a emitted sound or voice that may be perceived by a listener. These common steps and processes are generally followed by most forms of wireless communication and are exploited by the invention. Substitution of selected subsystems as provided herein may further contribute to recent trends of integrating more subsystems as technology develops towards consolidating different yet related components into a single unit or computer chip. These flexible telephone handsets and cartridges may be considered a combination of interchangeable and integrated components that support wireless communications.

As shown in FIG. 11, the service-specific microcontroller (SSMC) 114 may be positioned within the cartridge portion 116 and control a substantial portion of the interaction between various subsystems. The SSMC 114 may direct a variety of commands, including when the wireless telephone handset is turned on, which signals to send out at various times, and when to switch to another channel The handset-specific microcontroller component (HSMC) 118 may control the logic for operations selected for the handset, and may be connected to a data interface 122 for communication with peripherals For example, the HSMC may control or perform functions within handset components 120 such as handling the memory architecture for the handset unit, performing automatic callback, enabling volume and display control, controlling the battery, and any other duties that are not specific to the wireless system. In some configurations, the SSMC 114 and the HSMC 118 may be integrated and found on the same computer chip. Moreover, the SSMC 114 or HSMC 118 may include RAM and/or ROM components or other memory components. Other components in the wireless handset cartridge may be also substituted with other components for different systems that have similar functionality. For example, a removable cartridge may be provided for operation in a GSM wireless system that includes a RF/IF subsystem 124 and antenna 125, baseband processor system 126, power management system 128, and other selected components in the cartridge. Another cartridge with similar components may be adapted and designed specifically for operation within a different wireless system. These cartridges may be configured to use smartcards that may be also used in combination with the present invention. While these types of modular devices having integrated circuits themselves may include additional functionality for their respective devices, the concepts provided herein facilitate and increase their flexible use within multiple wireless systems. The removable cartridges and flexible handsets formed in accordance with the invention may effectively support the operation of entirely different wireless systems.

Figure 12:
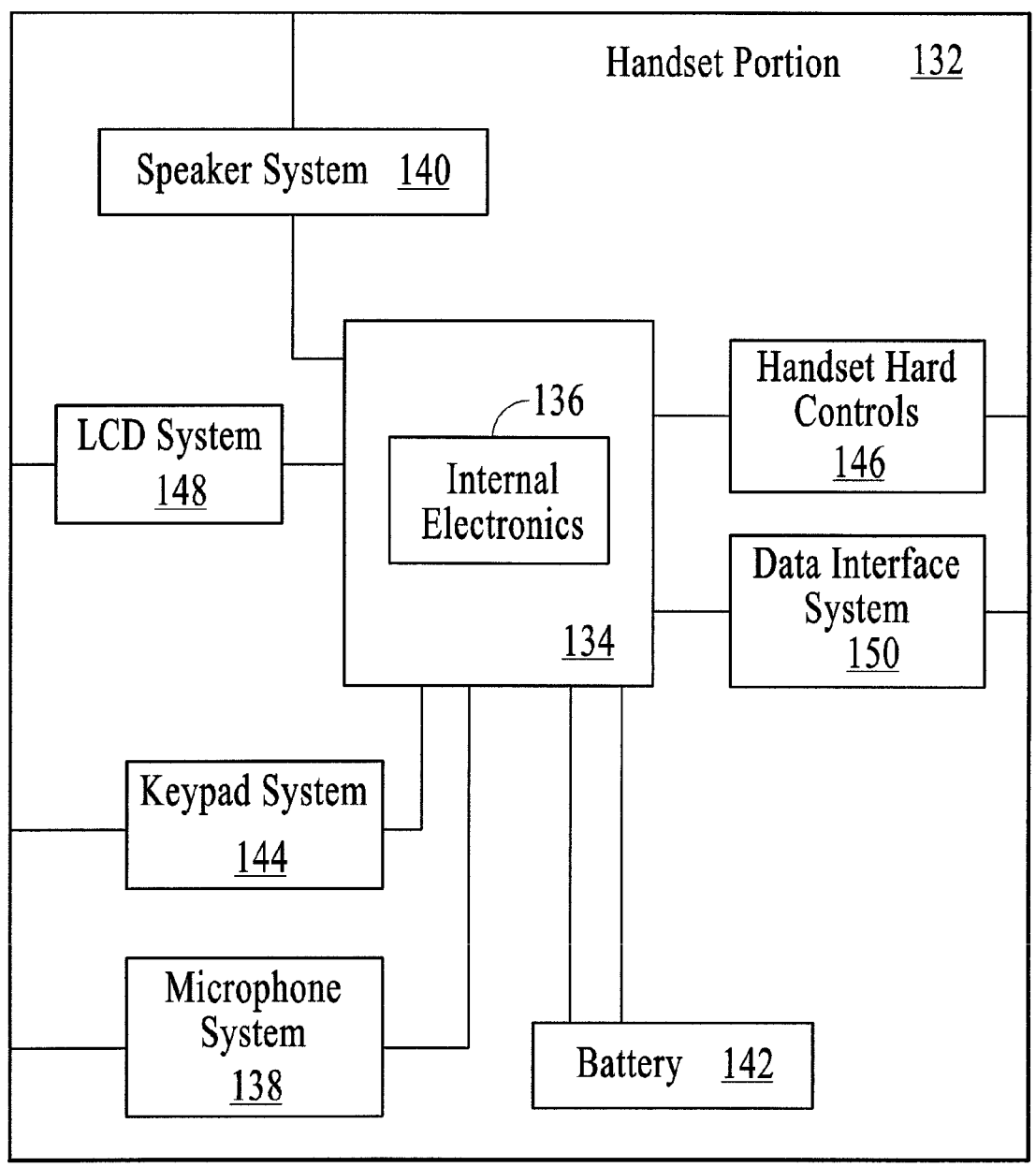
FIG. 12 is a block diagram illustrating the components of a typical wireless cellular telephone which includes internal electronics and a variety of external handset componentry.

FIG. 12 is a block diagram illustrating a variety of external handset componentry for a wireless cellular telephone handset 132. The internal electronics 136 for the handset may be positioned within a discrete cartridge section 134 permanently or removably attached to the handset case. Many different cartridge component variations may be provided herein since the handset/cartridge delineation may divide the wireless telephone assembly into at least two distinct parts, a handset and at least one cartridge. For example, some components ordinarily positioned within the cartridge may be actually placed external to the cartridge 134 and within the handset 132. Other components typically found in the handset 132 may be also located in the cartridge 134. The division of components may be accomplished in many ways to achieve different flexibility goals and to meet the demands of different wireless systems. The concept of providing multiple component separation may be further described upon reviewing general wireless telephone architecture. A flexible wireless telephone may include numerous components within a case such as the microphone system 138, speaker system 140, the battery 142, the keypad system 144, the hard-wired handset controls 146, the display or LCD component system 148, the antenna, a data interface system 150, the RF/IF component, the baseband processor, the voice processor the SSMC, the HSMC, and the power-management component. It should be noted that the keypad does not have to be a PC-AT keyboard, nor does it have to have a specified layout Any keypad configuration may be used with wireless telephones today. The telephone may even contain a security system as including a personal identification number locking feature or even a tracking recovery system that may be activated with keypad controls. Similarly, many variations are available for a display, microphone, speaker, antenna, or case. The handset may include a display device for providing visual information for a user. The microcontrollers in the cartridge may send $I^2C$ signals to the display when the display is updated. The handset case may be the physical skeleton of the wireless telephone, and may hold the handset components in one unit. The handset may further include a visible or hidden socket for connection with a cartridge. Many different types of battery architectures can also be used. More than one battery may be selected, and the power management component may be even split up and divided between the handset and cartridge. The telephone handset may be even configured to support a battery charger and a variety of other accessories. The battery may include battery recharging components and perform functions such as supplying power to a power management subsystem within in the cartridge. The power management subsystem may control and convert electrical energy from the battery to other systems within the wireless telephone. The power management subsystem may also include circuits to control power consumption when the unit is in actual use, when it is turned on but kept in an idle, sleep or standby mode, or when processors are operating at reduced speeds. Furthermore, the telephone may implement hardware and software to communicate over a wide area network (WAN) or a local area network (LAN) including local area wireless networks (LAWN) such as "Blue Tooth." The data interface system may support this functionality, and may also support operation within a data wireless network such as a 2-way paging service.

Figure 13:
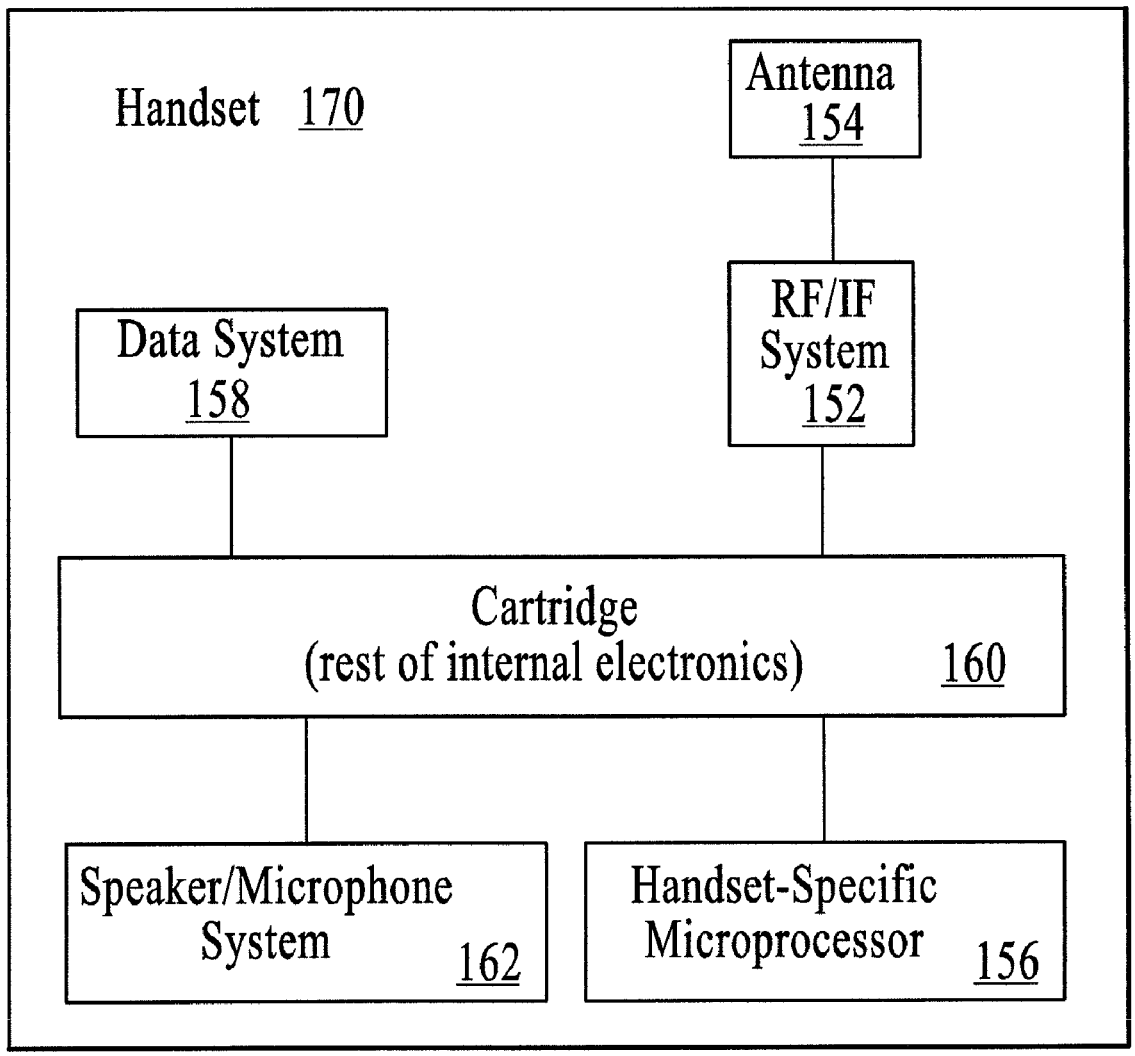
FIG. 13 is a block diagram illustrating an alternate embodiment of the present invention which provides a flexible wireless telephone and system cartridge of reduced cost where the RF/IF system and antenna are separate from the cartridge and are included in the handset.

FIG. 13 is a block diagram illustrating an alternate embodiment of the invention that includes a flexible wireless telephone and system cartridge. This configuration of the system may provide a system with a reduced cost in that the RF/IF system 152 and antenna 154 are separate from the cartridge 160, and are included in the handset 170. The handset-specific microprocessor 156 components may be also positioned in the handset section 170 to further reduce the number of components in the cartridge 160 which may, in turn, reduce the size and cost of the cartridge section. At the same time, the data 158 and speaker/microphone 162 systems may also be included in the handset 170. These handset components would no longer be upgradeable to change the featureset of the telephone with this configuration. When the antenna is located in the handset section 170, for example, the cartridge 160 may be significantly smaller in size, and may provide a relatively simpler design since the protruding antenna would be absent from the modular cartridge However, an antenna provided within the cartridge section 160 of the system may be preferable for many reasons such as eliminating the separate replacement of both the cartridge and the antenna when they are included together. The cartridge electronics may also be optimized for a single antenna such as impedance matching and other optimizations. The complexity of the circuitry between the antenna and the cartridge may be further simplified if the antenna was not contained in the handset. When upgrading or changing to a new system, exchanging two antennas and cartridge components separately may be avoided, and there may be a reduced risk of confusion as to which antenna may correspond to which cartridge. Another preferable embodiment of the invention provides an adaptable system where the cartridge has the choice of using the antenna in the cartridge section or an optional antenna in the handset section. The handset and cartridge may negotiate which antenna suited to use given the situation. For example, when in a telephone the cartridge may choose to use the cartridge's own internal antenna, but when in a transportation vehicle with a powerful antenna the cartridge may choose to use the vehicle's antenna. The antenna in the handset may in turn be removable itself. The invention again provides many different types of divisions and possible combinations for the subsystems which provide added flexibility However, it may be preferable for the handset of a flexible wireless telephone to include at least one electrical component such as a speaker. The casing for the handset may further include other components and related electrical connections In addition, handset components may be substantially universal and may operate with multiple wireless systems. When the handset includes a component that precludes its use with multiple wireless systems, this tends to restrict the ability of the system to provide a flexible wireless telephone. For example, when the telephone handset contains a filter that is only used with the AMPS standard, and does not operate within the GSM system, the telephone may be limited in its ability to provide a flexible wireless telephone. However, a flexible telephone for use with multiple systems may be provided if the AMPS filter was controllably disabled or bypassed when communicating with another wireless system. A handset filter that universally operates with many different wireless systems may preferably provide a flexible wireless telephone.

Figure 14:
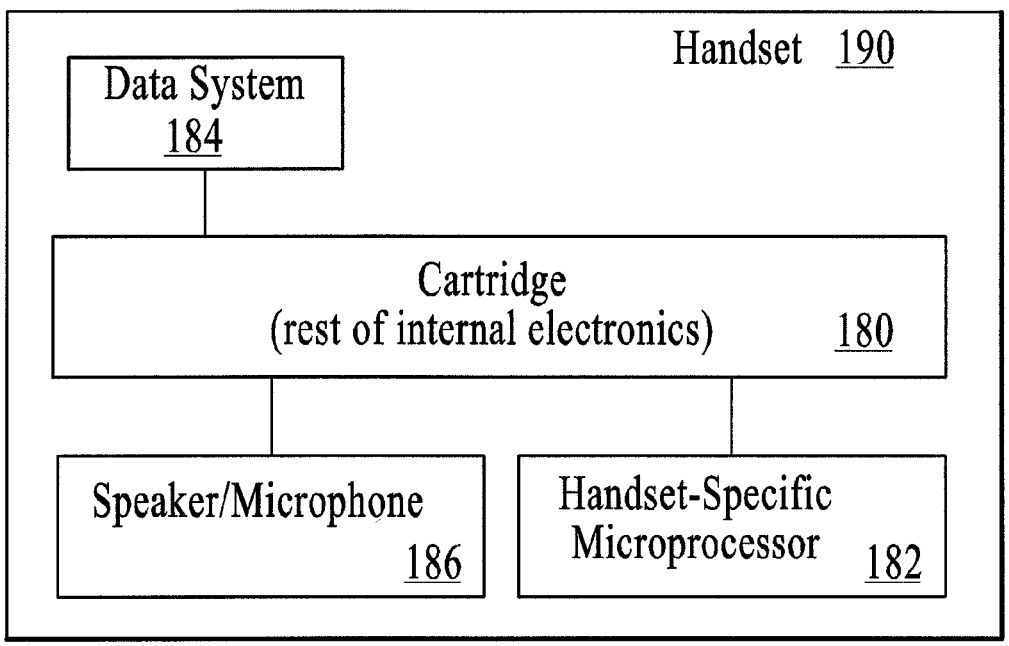
FIG. 14 is a block diagram illustrating yet another flexible wireless telephone and system cartridge that includes most of the internal electronics components except for the handset-specific microcontroller or microprocessor and external components including the speaker and the microphone

Another flexible wireless telephone and cartridge system provided herein is illustrated in FIG. 14. The majority of internal electronics components may be included within the cartridge section 180 except for the handset-specific microcontroller or microprocessor 182 components and external components such as the data system 184 and speaker/microphone subsystem 186. The handset-specific microprocessor 182 component is not necessarily integrated with the cartridge section 180, and may be either permanently hardwired with the handset 190 or included in a separate cartridge. As described above, particular benefits are provided with this type of configuration when selected subsystems are provided in the handset 190 as opposed to the cartridge portion 180.

Figure 15:
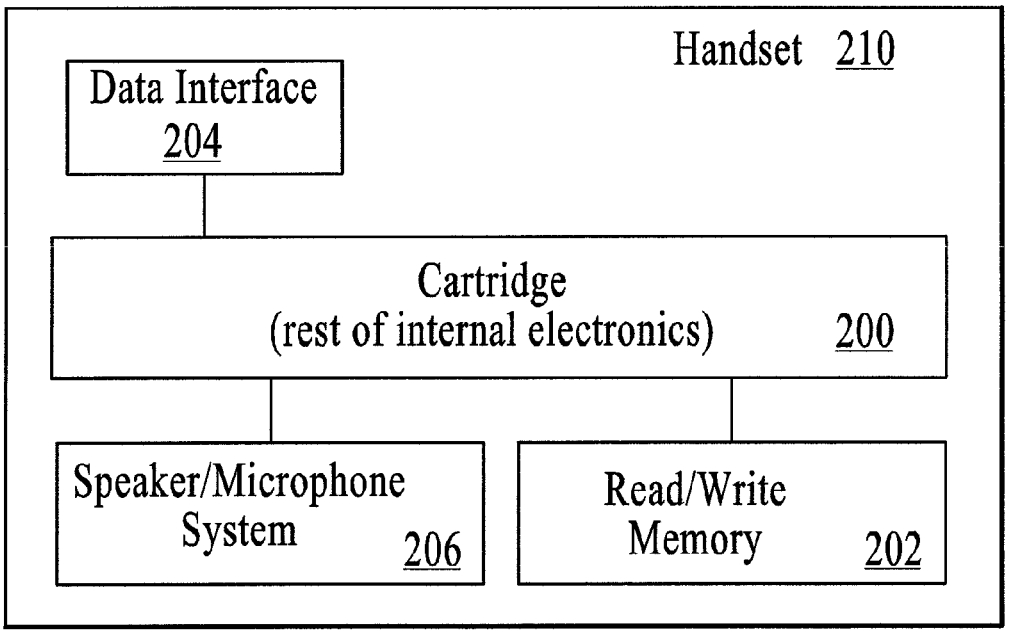
FIG. 15 is a flexible wireless telephone and system cartridge system that includes a distinct memory component for storing user data such as telephone numbers located in the handset section that may communicate with a microcontroller within the cartridge through a databus.

Another flexible wireless telephone and cartridge system is further provided herein as described in FIG. 15. A distinct read/write memory subsystem 202 may be included with the handset 210 for storing user data such as telephone numbers. The memory may be connected to and communicate with a microcontroller positioned within the cartridge 200 through a databus. This optional component may provide storage of user data. The optional memory component may also allow a user to store information such as telephone numbers and names, or wireless system specific data such as a Mobile Identification Number (MIN) In some applications, it may be particularly preferable to include a memory storage for user data. The memory component may be positioned within either the handset 210 or the cartridge 200. The memory component may be situated in the handset so that the user information is not lost when the cartridge 200 is replaced, or when the unit is upgraded or switched to a different wireless system by substituting the cartridge. Alternatively, the memory component may be included in a second cartridge or a mini-flash card. The second cartridge may be configured as a PCMCIA memory card, a Smartcard, a subscriber identity module (SIM) such as those used in GSM telephones, or some other removable configuration that may be connected to a corresponding handset port or socket. When the memory component is separate from the cartridge, the handset/cartridge interface pin-out described here may be augmented with a data bus that includes address pins, data pins, and control pins This interface may provide access of data across the handset/cartridge interface. The data bus may include an 8-bit design, as suggested with certain AMPS implementations as described in the technical literature from Phillips, a 16-bit design, as suggested with a GSM implementation, a 32-bit such as PCI or Cardbus, or even a serial bus such as Universal Serial Bus (USB) or IEEE-1394. There are additional components that may be included within the handset section such as an external jack for connection to a headset for hands-free operation, a data interface 204 for connecting the wireless telephone to a modem or computer, additional LEDs for battery-life warnings and other signals, and additional controls for parameters like speaker/microphone 206 volume control, ringer volume control, and backlighting. It may be preferable to include these optional components in a flexible wireless telephone for certain applications, and may provide a more versatile and functional wireless telephone. The telephone may avoid inclusion of these additional elements, and may conform with relatively simplified design parameters.

Figure 16:
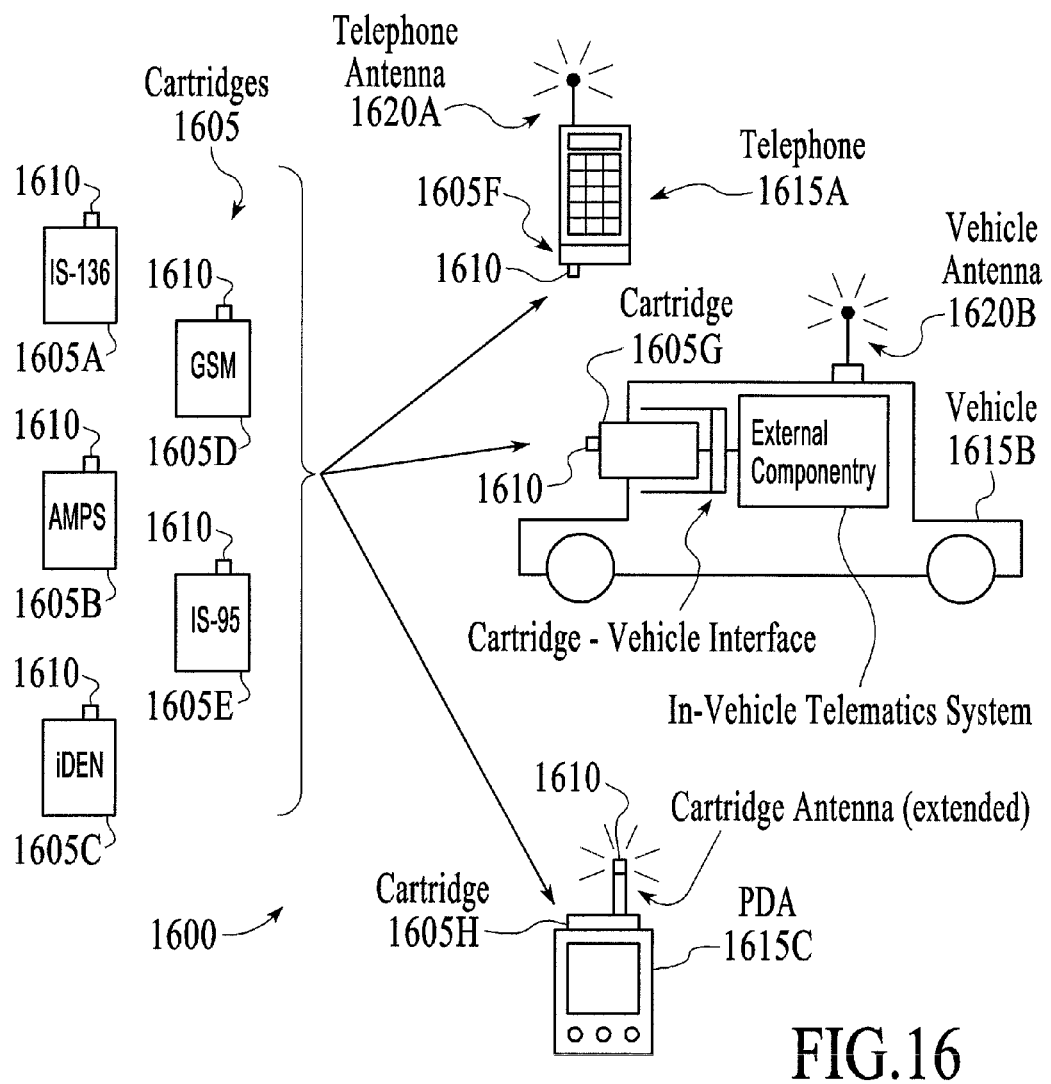
FIG. 16 is a simplified system incorporating a series of one or more interchangeable cartridges and devices supporting multiple wireless communications standards.

In yet another embodiment of the invention, the diagram in FIG. 16 shows a flexible wireless device system that allows different cartridges to work with a wide variety of handset devices through a common handset/cartridge interface. Handset devices may be wireless telephones, wireless PDAs, wireless transportation vehicles, or any other wireless device. Each device contains a handset/cartridge interface that mates with cartridges that support, a variety of wireless systems, including IS-136, AMPS, iDEN, GSM, and IS-95 These interfaces conform to the same electrical and mechanical specification, allowing any number of cartridges to be mated to any number of devices so long as the cartridge and device support the same electrical and mechanical specification. Thus, one vehicle, telephone, or PDA design can gain access to a multitude of wireless systems by selecting the appropriate cartridge for the desired system and mating the cartridge with the interface in the device.

The flexible wireless device system 1600 in FIG. 16 also shows how a cartridge 1605 may configure its operation based on the characteristics of the device 1615A-1615C For example, the system 1600 may allow the cartridge 1605 to dictate whether to use the antenna 1610 contained in the cartridge 1605 or the antenna 1620A or 1620B contained in the device 1615A or 1615B When a cartridge 1605 is placed in the wireless telephone 1615A, the cartridge 1605F and telephone 1615A may communicate information via electrical signals sent over the interface (not shown). Using this information, the cartridge 1605F may recognize that the antenna 1610 in the cartridge 1605F cannot be used when connected to the telephone 1615A, and thus may send and receive radio signals using the device's antenna 1620A instead of the cartridge's antenna 1610. When the cartridge is placed in the vehicle 161 SB, the cartridge 1605G and vehicle 161 SB may also communicate information via electrical signals sent over the interface (not shown). Using this information, the cartridge 1605G may recognize that although the antenna 1610 in the cartridge 1605G is available, the antenna 1620B in the device 1615B is much more powerful, and therefore should be used instead. When the cartridge 1605H is placed in the PDA 1615C, the cartridge 1605H and PDA 1615C may communicate information via electrical signals sent over the interface (not shown). The cartridge 1605H may recognize that there is no antenna in the PDA 1615C, so the cartridge 1605H uses the retractable antenna 1610 in the cartridge 1605H to send and receive radio signals.

Figure 17:
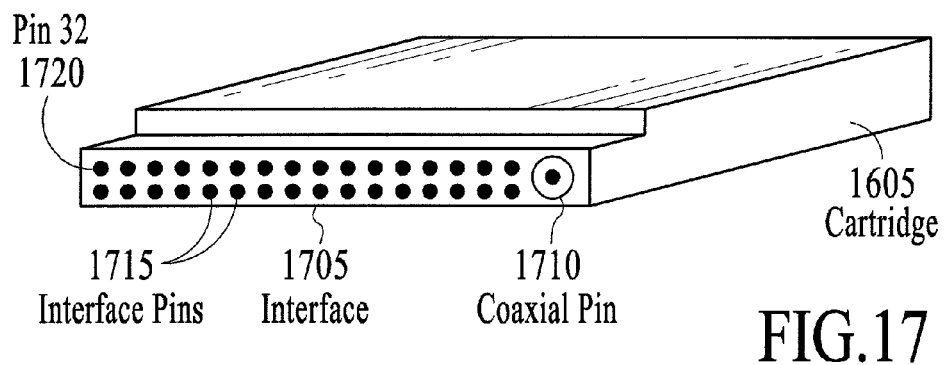
FIG. 17 is an enlarged perspective view of a cartridge formed with a series of pins and at least one coaxial pin to communicate or interface with various devices including a PDA, an in-vehicle telematics system and a telephone.

FIGS. 17 and 18 show how this common handset/cartridge interface 1705 may be structured to support the flexible wireless systems provided herein. As seen in FIG. 17, the cartridge 1605 may contain 32 pin receptacles 1715 to connect to 32 straight pins on the interface 1705 when the cartridge 1605 is mated with the interface in a device. The cartridge 1605 may also contain one or more coaxial jacks 1710 to connect to one or more coaxial plugs on the interface. As shown in FIG. 18, pins 3, 4, 6, 8, 24, and 26 may be reserved in the same manner as the reserved pins in FIG. 2B. Pins 2, 7, 9, 13, 20, and 30 may be used for ground. Pins 19, 23, 25, 27, and 29 may be used to supply power to the internal electronics. Pin 10 may be used to supply power to other electronics in the cartridge 1605. Pins 1, 31, and 32 may be used to support serial data communications using standards common in the industry such as straight serial, Universal Serial Bus (USB), IEEE 1394, or a proprietary data transmission scheme. The cartridge 1605 and handset may send information over the interface 1705 to determine which transmission scheme to use, or pin 28 can be used to decide whether to transmit using straight serial or USB Data sent over these pins may include AT commands common in the industry or a proprietary messaging scheme. Pin 5 may be used to help the cartridge 1605 choose whether to use the antenna in the handset or the antenna 1610 in the cartridge 1605. Data sent over Pins 1 and 32 may also be used in this decision, as well as the negotiation of other operating characteristics Pins 11, 12, 21, and 22 may be used to communicate analog voice signals over the interface 1705. This takes the burden of digitizing voice signals off the handset and puts it on the cartridge 1605, thus providing handsets with less components. It also allows for more efficient voice transmission over AMPS systems Pin 14 may be used to reset the operation of the cartridge 1605 and the interface 1705 Pins 15, 16, 17, and 18 may be used to communicate Pulse Code Modulation (PCM) voice signals over the interface 1705 This may take advantage of already existing PCM electronics commonly found in many handsets and devices, reducing the processing load on the cartridge 1605. The cartridge 1605 may configure its operation to use either the analog voice pins or the PCM pins based on signals communicated between the handset and cartridge 1605 via pins 1 and 32 or the analog and PCM pins themselves Pins A1 and A2 may be used to communicate RF signals between the cartridge 1605 and the antenna on the handset.

While the present invention has been described with reference to the aforementioned applications explained in detail above, these descriptions and illustrations of the preferred embodiments and methods are not meant to be construed in a limiting sense. It shall be understood that all aspects of the present invention are not limited to the specific depictions, configurations or relative proportions set forth herein which depend upon a variety of conditions and variables. Various modifications in form and detail of the various embodiments of the disclosed invention, as well as other variations of the present invention, will be apparent to a person skilled in the art upon reference to the present disclosure. It is therefore contemplated that the appended claims shall cover any such modifications, variations or equivalents of the described embodiments as falling within the true spirit and scope of the present invention.

What is claimed is:

1. A cellular mobile device comprising:
    a handset portion having a processor that facilitates communication with one or more cellular network systems, each cellular network system providing wireless communication for the cellular mobile device, and further having a first antenna for communication over at least a first cellular network system of the one or more cellular network systems;
    a cartridge removably coupled to the handset portion through an interface, the cartridge including a radio frequency (RF) or baseband processing subsystem and a second antenna for communication over a second cellular network system of the one or more cellular network systems;
    a service selection processing component executable by at least one of the handset and the cartridge and operable to utilize either the first or second cellular network system and to select the first antenna of the handset or the second antenna resident in the installed cartridge depending on one or more operational parameters and the utilized cellular network system; and
    a unitary housing, wherein the interface comprises one of a plurality of interfaces provided through a slot in the unitary housing, the slot configured to accommodate a respective cellular device cartridge of a plurality of different modular cellular device cartridges, wherein each of the different modular cellular device cartridges supports a different cellular network system.

2. The mobile device as recited in claim 1 wherein the installed cartridge selects which antenna to use between its own resident antenna and the handset antenna based on information sent from the device over the interface.

3. The mobile device of claim 1 wherein the cartridge is a pre-paid wireless cartridge.

4. The mobile device of claim 1 wherein the first cellular network and second cellular network are different cellular networks.

5. A communication device comprising:
    a shell having a processor that facilitates communication with one or more cellular network systems, each cellular network system providing wireless communication for the cellular mobile device, and further having a first antenna for communication over at least a first cellular network system of the one or more cellular network systems;
    a cartridge removably coupled to the shell through an interface, the cartridge including a radio frequency (RF) or baseband processing subsystem and a second antenna for communication over a second cellular network system of the one or more cellular network systems;
    a service selection processing component executable by at least one of the shell and the cartridge and operable to utilize either the first or second cellular network system and to select the first antenna of the shell or the second antenna resident in the installed cartridge depending on one or more operational parameters and the utilized cellular network system; and
    a housing having one or more slots, each slot of the one or more slots configured to accommodate a respective cellular device cartridge of one or more different modular cellular device cartridges, wherein each of the different modular cellular device cartridges supports a unique cellular network system.

6. The communication device as recited in claim 5 wherein the installed cartridge selects which antenna to use between its own resident antenna and the shell antenna based on information sent from the device over the interface.

7. The communication device of claim 5 wherein the housing comprises a portion of one of: a transportation vehicle, a workstation class computer, and a handheld computer.

8. A communication device comprising:
    a shell having a processor that facilitates communication with one or more cellular network systems, each cellular network system providing wireless communication for the cellular mobile device, and further having a first antenna for communication over at least a first cellular network system of the one or more cellular network systems;
    a cartridge removably coupled to the shell through an interface, the cartridge including a radio frequency (RF) or baseband processing subsystem and a second antenna for communication over a second cellular network system of the one or more cellular network systems, and the interface including a connection to the first antenna contained in the shell;
    a service selection processing component executable by at least one of the shell and the cartridge and operable to utilize either the first or second cellular network system and to select the first antenna of the shell or the second antenna resident in the installed cartridge depending on one or more operational parameters and the utilized cellular network system; and
    a housing having a slot configured to allow a completion of the interface through a coupling of the shell and the cartridge, and to accommodate a respective cellular device cartridge of one or more different modular cellular device cartridges, wherein each of the different modular cellular device cartridges supports a unique cellular network system.

9. The communication device of claim 8 wherein the interface comprises a pin array including a plurality of matching pin and pin receptacle pairs disposed on the shell and the removably coupled cartridge, wherein the interface comprises one or more logical signal definitions defined by the unique cellular network system supported by the removably coupled cartridge.

10. The communication device of claim 8 wherein the housing comprises a portion of one of: a transportation vehicle, a workstation class computer, and a handheld computer.

11. A communication device shell comprising:
- a processor that facilitates communication with one or more cellular network systems, each cellular network system providing wireless communication for the communication device shell;
- a first antenna for communication over at least a first cellular network system of the one or more cellular network systems;
- an electrical interface coupled to the processor and to the first antenna for removable connection of a cartridge to the shell, the cartridge including a radio frequency (RF) or baseband processing subsystem, a second antenna for communication over the one or more cellular network systems, and a service selection processing component executable by the cartridge and operable to utilize either the first or a second cellular network system and to select the first antenna of the device or the second antenna resident in the installed cartridge depending on one or more operational parameters and the utilized cellular network system, the electrical interface further including a connector for connection to the second antenna;
- a housing having a slot configured to allow a completion of the interface through a coupling of the shell and the cartridge, and to accommodate a respective cellular device cartridge of one or more different modular cellular device cartridges, wherein each of the different modular cellular device cartridges supports a unique cellular network system.

\* \* \* \* \*